(12) United States Patent
Kleinwaechter et al.

(10) Patent No.: US 11,865,828 B2
(45) Date of Patent: Jan. 9, 2024

(54) THICK AND ABSORBENT AND/OR FLEXIBLE TOILET TISSUE

(71) Applicant: The Procter & Gamble Company, Cincinnati, OH (US)

(72) Inventors: Joerg Kleinwaechter, Loveland, OH (US); Eric Bryan Bond, Maineville, OH (US); Matthew Gary McKee, Cincinnati, OH (US); Hasan Eroglu, Liberty Township, OH (US); Tyler Jacob Werner, West Chester, OH (US); Jeffrey Chan, Cincinnati, OH (US); Joshua Thomas Fung, Cincinnati, OH (US); Jeffrey Glen Sheehan, Cincinnati, OH (US); Paul Dennis Trokhan, Cincinnati, OH (US); Jean A. Ibrahim, Cincinnati, OH (US)

(73) Assignee: The Procter & Gamble Company, Cincinnati, OH (US)

(*) Notice: Subject to any disclaimer, the term of this patent is extended or adjusted under 35 U.S.C. 154(b) by 222 days.

(21) Appl. No.: 17/402,777

(22) Filed: Aug. 16, 2021

(65) Prior Publication Data
US 2021/0370637 A1    Dec. 2, 2021

Related U.S. Application Data

(60) Continuation of application No. 17/023,433, filed on Sep. 17, 2020, now Pat. No. 11,123,951, which is a
(Continued)

(51) Int. Cl.
    B32B 5/26       (2006.01)
    B32B 3/26       (2006.01)
    (Continued)

(52) U.S. Cl.
    CPC ............. B32B 5/26 (2013.01); B32B 3/263 (2013.01); B32B 37/153 (2013.01); B32B 37/20 (2013.01);
    (Continued)

(58) Field of Classification Search
    CPC ......... B32B 5/26; B32B 3/263; B32B 37/153; B32B 37/20; B32B 2262/04; B32B 2307/726; B32B 2555/00
    (Continued)

(56) References Cited

U.S. PATENT DOCUMENTS 4,501,640 A   2/1985  Soerens
4,528,316 A   7/1985  Sorens
(Continued)

FOREIGN PATENT DOCUMENTS

ES    1075636 U      11/2011
KR    101443872 B1    9/2014

OTHER PUBLICATIONS

All Office Actions; U.S. Appl. No. 17/528,913, filed Nov. 17, 2021.
(Continued)

*Primary Examiner* — Brent T O'Hern
(74) *Attorney, Agent, or Firm* — James E. Oehlenschlager; Christopher Brant Cook

(57) ABSTRACT

Thick and absorbent and/or flexible toilet tissue and methods for making same are provided.

20 Claims, 10 Drawing Sheets

Related U.S. Application Data division of application No. 16/424,682, filed on May 29, 2019, now Pat. No. 10,786,972.

(60) Provisional application No. 62/680,160, filed on Jun. 4, 2018.

(51) Int. Cl.
  *B32B 37/20* (2006.01)
  *B32B 37/15* (2006.01)

(52) U.S. Cl.
  CPC ..... *B32B 2262/04* (2013.01); *B32B 2307/726* (2013.01); *B32B 2555/00* (2013.01)

(58) Field of Classification Search
  USPC .......................................................... 428/172
  See application file for complete search history.

(56) References Cited

U.S. PATENT DOCUMENTS

| | | | |
|---|---|---|---|
| 6,461,476 B1 | 10/2002 | Goulet et al. | |
| 7,785,443 B2 | 8/2010 | Hermans et al. | |
| 8,082,791 B2 | 12/2011 | Gruener | |
| 8,216,427 B2 | 7/2012 | Klerelid et al. | |
| 8,252,142 B2 | 8/2012 | Gane et al. | |
| 8,262,857 B2 | 9/2012 | Hermans et al. | |
| 8,366,878 B2 | 2/2013 | Klerelid et al. | |
| 8,426,301 B2 | 4/2013 | Oh et al. | |
| 8,834,679 B2 | 9/2014 | Kim et al. | |
| 8,968,517 B2 | 3/2015 | Ramaratnam et al. | |
| 9,089,452 B2 * | 7/2015 | Manifold | D21H 11/00 |
| 9,127,408 B2 | 9/2015 | Qin et al. | |
| 9,243,367 B2 | 1/2016 | Rekoske et al. | |
| 9,283,730 B2 | 3/2016 | Zwick et al. | |
| 9,464,387 B2 | 10/2016 | Mcneil et al. | |
| 9,988,766 B2 | 6/2018 | Chou et al. | |
| 10,385,515 B2 | 8/2019 | Young et al. | |
| 10,786,972 B2 | 9/2020 | Kleinwaechter et al. | |
| 10,814,587 B2 | 10/2020 | Kleinwaechter et al. | |
| 2003/0211800 A1 | 11/2003 | Duncan et al. | |
| 2006/0027349 A1 | 2/2006 | Shannon et al. | |
| 2008/0023873 A1 | 1/2008 | Mankad et al. | |
| 2009/0056892 A1 | 3/2009 | Rekoske et al. | |
| 2009/0100916 A1 | 4/2009 | Gruener | |
| 2010/0159200 A1 | 6/2010 | Soerens et al. | |
| 2010/0258258 A1 | 10/2010 | Gane et al. | |
| 2011/0039054 A1 | 2/2011 | Cabell et al. | |
| 2011/0104444 A1 | 5/2011 | Barnholtz et al. | |
| 2011/0180223 A1 | 7/2011 | Klerelid et al. | |
| 2012/0031576 A1 | 2/2012 | Gane et al. | |
| 2013/0216809 A1 | 8/2013 | Cabell et al. | |
| 2013/0302566 A1 | 11/2013 | Barnholtz et al. | |
| 2014/0050890 A1 | 2/2014 | Zwick et al. | |
| 2014/0096924 A1 | 4/2014 | Rekoske et al. | |
| 2014/0178660 A1 | 6/2014 | Kim et al. | |
| 2015/0225903 A1 | 8/2015 | Jeannot et al. | |
| 2016/0097163 A1 | 4/2016 | Rekoske et al. | |
| 2017/0022670 A1 | 1/2017 | Bailey et al. | |
| 2017/0226697 A1 | 8/2017 | Ostendorf et al. | |
| 2021/0001597 A1 | 1/2021 | Kleinwaechter et al. | |
| 2021/0001598 A1 | 1/2021 | Kleinwaechter et al. | |

OTHER PUBLICATIONS

U.S. Appl. No. 17/528,913, filed Nov. 17, 2021, to Joerg Kleinwaechter et. al.
All Office Actions; U.S. Appl. No. 16/424,682, filed May 29, 2019.
All Office Actions; U.S. Appl. No. 16/424,791, filed May 29, 2019.
All Office Actions; U.S. Appl. No. 17/023,433, filed Sep. 17, 2020.
All Office Actions; U.S. Appl. No. 17/024,001, filed Sep. 17, 2020.

* cited by examiner

THICK AND ABSORBENT AND/OR FLEXIBLE TOILET TISSUE

FIELD OF THE INVENTION

The present invention relates to toilet tissue, and more particularly to thick and absorbent and/or flexible toilet tissue and methods for making same.

BACKGROUND OF THE INVENTION

It is well known that consumers of toilet tissue desire thick and absorbent and/or flexible toilet tissue. However, producers of toilet tissue have to date suffered from the dichotomies that as the thickness (as measured according to the Caliper Test Method described herein) of the toilet tissue and/or the thickness of the one or more fibrous structures making up the toilet tissue is increased, for example by creating more structure, for example imparting patterned surfaces to the fibrous structures, for example wet-formed patterned surfaces, on the one or more fibrous structures making up the toilet tissue, the flexibility (as measured according to the Plate Stiffness Test Method described herein) of the toilet tissue may be negatively impacted (Plate Stiffness value as measured according to the Plate Stiffness Test Method described herein increases).

In addition, another contradiction is that as the thickness (as measured by the Caliper Test Method described herein) of the toilet tissue and/or the thickness of the one or more fibrous structure plies making up the toilet tissue is increased, for example by creating more structure, for example imparting patterned surfaces to the fibrous structures, for example wet-formed patterned surfaces, on the one or more fibrous structures making up the toilet tissue, the smoothness of the toilet tissue is decreased (is less smooth and/or more rough).

Still yet another contradiction is that as absorbency (as measured to the CRT Test Method described herein) of the toilet tissue is increased, for example by creating more interply void space between multiple fibrous structure plies, for example two or more and/or three or more fibrous structure plies making up the toilet tissue, for example by creating more structure, for example imparting patterned surfaces to the fibrous structures, for example wet-formed patterned surfaces, on one or more of the fibrous structure plies, the smoothness of the toilet tissue is decreased (is less smooth and/or more rough).

Even yet another contradiction is that as absorbency (as measured to the CRT Test Method described herein) of the toilet tissue is increased, for example by creating more interply void space between multiple fibrous structure plies, for example two or more and/or three or more fibrous structure plies making up the toilet tissue, for example by creating more structure, for example imparting patterned surfaces to the fibrous structures, for example wet-formed patterned surfaces, on one or more of the fibrous structure plies, the flexibility (as measured according to the Plate Stiffness Test Method described herein) is negatively impacted (Plate Stiffness value as measured according to the Plate Stiffness Test Method described herein increases).

As seen from above, there has existed a problem with making thick (Calipers greater than 20.0 mils as measured according to the Caliper Test Method described herein) and absorbent (CRT Capacities greater than 15 g/g as measured according to the CRT Test Method described herein) and/or flexible (Plate Stiffness of less than 8.00 N*mm as measured according to the Plate Stiffness Test Method described herein) while still exhibiting a surface smoothness acceptable to consumers of toilet tissue.

The methods for increasing thickness and/or absorbency of toilet tissue negatively impacts surface smoothness of the toilet tissue and/or fibrous structure plies making up the toilet tissue. However, surface properties of toilet tissue are very important to consumers. If a toilet tissue's surface properties are considered too rough such that it doesn't glide on the skin sufficiently to keep from irritating the skin, then the toilet tissue exhibits consumer negatives for certain consumers. An example of such a known toilet tissue is a commercially available cellulose pulp fiber-based, wet-laid toilet tissue comprising a wet-laid fibrous structure (web material), for example a very coarse, uncreped, through-air-dried wet-laid fibrous structure.

Formulators have attempted to overcome the consumer negatives of such rough toilet tissue, by depositing a surface material, for example a surface chemistry, such as a softening agent, for example silicone, onto one or more external surfaces, for example a consumer-contacting surface. However, such attempts have been less than successful when the toilet tissue comprises highly structured fibrous structure plies that generate increased calipers compared to calipers of known toilet tissues and/or increased absorbency compared to absorbencies of known toilet tissue.

In light of the foregoing, there exists a need for a toilet tissue that exhibits increased thickness (as measured according to the Caliper Test Method described herein) and increased absorbency (as measured according to the CRT Test Method described herein) and/or increase flexibility (as measured according to the Plate Stiffness Test Method described herein) while still providing at least one exterior surface that exhibits surface properties, for example a smooth and/or movable surface, that consumers desire.

SUMMARY OF THE INVENTION

The present invention fulfills the need described above by providing a toilet tissue, for example a multi-ply (two or more or three or more fibrous structure plies) that is thick (Calipers greater than 20.0 mils as measured according to the Caliper Test Method described herein) and absorbent (CRT Capacities greater than 15 g/g as measured according to the CRT Test Method described herein) and/or flexible (Plate Stiffness of less than 8.00 N*mm as measured according to the Plate Stiffness Test Method described herein) while still comprising at least one exterior surface that exhibits surface properties, for example a smooth and/or movable surface, that consumers desire.

It has been unexpectedly found that one solution to the problem described above is providing a toilet tissue comprising one or more patterned surfaces such that the toilet tissue exhibits a thickness (Caliper greater than 20.0 mils as measured according to the Caliper Test Method described herein) and an absorbency (CRT Capacity greater than 15 g/g as measured according to the CRT Test Method described herein) and/or a thickness (Caliper greater than 20.0 mils as measured according to the Caliper Test Method described herein) and a flexibility (Plate Stiffness of less than 8.00 N*mm as measured according to the Plate Stiffness Test Method described herein) while still comprising at least one exterior surface that exhibits surface properties, for example a smooth and/or movable surface, that consumers desire.

A toilet tissue that achieves the thickness, absorbency, and/or flexible properties and optionally, surface properties comprises a toilet tissue, for example a multi-ply toilet tissue comprising two or more fibrous structure plies wherein at least one of the two or more fibrous structure plies comprises a structured fibrous structure ply, for example a structured pulp fiber-containing fibrous structure ply, such as a structured (through-air-dried, fabric-creped, belt-creped, ATMOS, or NTT, in particular through-air-dried, fabric-creped, or belt-creped, especially through-air-dried) wood pulp fiber-containing fibrous structure ply, that exhibits a Caliper of greater than 20.0 mils as measured according to the Caliper Test Method described herein and a CRT Capacity of greater than 15 g/g as measured according to the CRT Test Method described herein and/or a Plate Stiffness of less than 8.00 N*mm as measured according to the Plate Stiffness Test Method described herein.

A toilet tissue of the present invention, for example a multi-ply (two or more or three or more fibrous structure plies) toilet tissue may comprise at least one fibrous structure ply comprising a plurality of fibrous elements, wherein the toilet tissue exhibits a caliper of greater than 20.0 mils as measured according to the Caliper Test Method and a CRT Capacity of greater than 15 g/g as measured according to the CRT Test Method, is provided.

A toilet tissue of the present invention, for example a multi-ply (two or more or three or more fibrous structure plies) toilet tissue may comprise at least one fibrous structure ply comprising a plurality of fibrous elements, wherein the toilet tissue exhibits a caliper of greater than 20.0 mils as measured according to the Caliper Test Method and a Plate Stiffness of less than 8.00 N*mm as measured according to the Plate Stiffness Test Method, is provided.

A roll of toilet tissue of the present invention may comprise the toilet tissue, for example a multi-ply (two or more or three or more fibrous structure plies) toilet tissue of the present invention, is provided.

A package of the present invention may comprise one or more rolls of toilet tissue, for example a multi-ply (two or more or three or more fibrous structure plies) toilet tissue of the present invention, is provided.

A method for making a toilet tissue, for example a multi-ply (two or more or three or more fibrous structure plies) toilet tissue of the present invention may comprise the steps of:
  a. providing a first fibrous structure ply comprising a plurality of fibrous elements;
  b. providing a second fibrous structure ply comprising a plurality of fibrous elements; and
  c. adhesively bonding the first fibrous structure ply to the second fibrous structure ply such that a toilet tissue that exhibits a caliper of greater than 20.0 mils as measured according to the Caliper Test Method and a CRT Capacity of greater than 15 g/g as measured according to the CRT Test Method is formed, is provided.

A method for making a roll of toilet tissue, for example a multi-ply (two or more or three or more fibrous structure plies) toilet tissue of the present invention may comprise the steps of:
  a. providing a first fibrous structure ply comprising a plurality of fibrous elements;
  b. providing a second fibrous structure ply comprising a plurality of fibrous elements;
  c. adhesively bonding the first fibrous structure ply to the second fibrous structure ply such that a toilet tissue that exhibits a caliper of greater than 20.0 mils as measured according to the Caliper Test Method and a CRT Capacity of greater than 15 g/g as measured according to the CRT Test Method is formed; and
  d. winding the toilet tissue into a roll of toilet tissue, is provided.

A method for making a toilet tissue, for example a multi-ply (two or more or three or more fibrous structure plies) toilet tissue of the present invention may comprise the steps of:
  a. providing a first fibrous structure ply comprising a plurality of fibrous elements;
  b. providing a second fibrous structure ply comprising a plurality of fibrous elements; and
  c. adhesively bonding the first fibrous structure ply to the second fibrous structure ply such that a toilet tissue that exhibits a caliper of greater than 20.0 mils as measured according to the Caliper Test Method and a Plate Stiffness of less than 8.00 N*mm as measured according to the Plate Stiffness Test Method is formed, is provided.

A method for making a roll of toilet tissue, for example a multi-ply (two or more or three or more fibrous structure plies) toilet tissue of the present invention may comprise the steps of:
  a. providing a first fibrous structure ply comprising a plurality of fibrous elements;
  b. providing a second fibrous structure ply comprising a plurality of fibrous elements;
  c. adhesively bonding the first fibrous structure ply to the second fibrous structure ply such that a toilet tissue that exhibits a caliper of greater than 20.0 mils as measured according to the Caliper Test Method and a Plate Stiffness of less than 8.00 N*mm as measured according to the Plate Stiffness Test Method is formed; and
  d. winding the toilet tissue into a roll of toilet tissue, is provided.

A method for making a toilet tissue, for example a multi-ply (two or more or three or more fibrous structure plies) toilet tissue of the present invention may comprise the steps of:
  a. providing a first web material;
  b. depositing a plurality of filaments onto a surface of the first web material such that a first fibrous structure ply is formed;
  c. providing a second fibrous structure ply;
  d. adhesively bonding the second fibrous structure ply to the first fibrous structure ply such that a toilet tissue that exhibits a caliper of greater than 20.0 mils as measured according to the Caliper Test Method and a CRT Capacity of greater than 15 g/g as measured according to the CRT Test Method is formed, is provided.

A method for making a roll of toilet tissue, for example a multi-ply (two or more or three or more fibrous structure plies) toilet tissue of the present invention may comprise the steps of:
  a. providing a first web material;
  b. depositing a plurality of filaments onto a surface of the first web material such that a first fibrous structure ply is formed;
  c. providing a second fibrous structure ply;
  d. adhesively bonding the second fibrous structure ply to the first fibrous structure ply such that a toilet tissue that exhibits a caliper of greater than 20.0 mils as measured according to the Caliper Test Method and a CRT Capacity of greater than 15 g/g as measured according to the CRT Test Method is formed; and
  e. winding the toilet tissue into a roll of toilet tissue, is provided.

A method for making a toilet tissue, for example a multi-ply (two or more or three or more fibrous structure plies) toilet tissue of the present invention may comprise the steps of:
 a. providing a first web material;
 b. depositing a plurality of filaments onto a surface of the first web material such that a first fibrous structure ply is formed;
 c. providing a second fibrous structure ply;
 d. adhesively bonding the second fibrous structure ply to the first fibrous structure ply such that a toilet tissue that exhibits a caliper of greater than 20.0 mils as measured according to the Caliper Test Method and a Plate Stiffness of less than 8.00 N*mm as measured according to the Plate Stiffness Test Method is formed, is provided.

A method for making a roll of toilet tissue, for example a multi-ply (two or more or three or more fibrous structure plies) toilet tissue of the present invention may comprise the steps of:
 a. providing a first web material;
 b. depositing a plurality of filaments onto a surface of the first web material such that a first fibrous structure ply is formed;
 c. providing a second fibrous structure ply;
 d. adhesively bonding the second fibrous structure ply to the first fibrous structure ply such that a toilet tissue that exhibits a caliper of greater than 20.0 mils as measured according to the Caliper Test Method and a Plate Stiffness of less than 8.00 N*mm as measured according to the Plate Stiffness Test Method is formed; and
 e. winding the toilet tissue into a roll of toilet tissue, is provided.

The present invention provides a toilet tissue, for example a multi-ply (two or more or three or more fibrous structure plies) toilet tissue that exhibits a thickness and absorbency and/or flexibility while comprising at least one exterior surface that exhibits surface properties, for example a smooth and/or movable surface, that consumers desire, and methods for making such toilet tissue, for example a multi-ply (two or more or three or more fibrous structure plies) toilet tissue.

DETAILED DESCRIPTION OF THE INVENTION

Definitions

Figure 1:
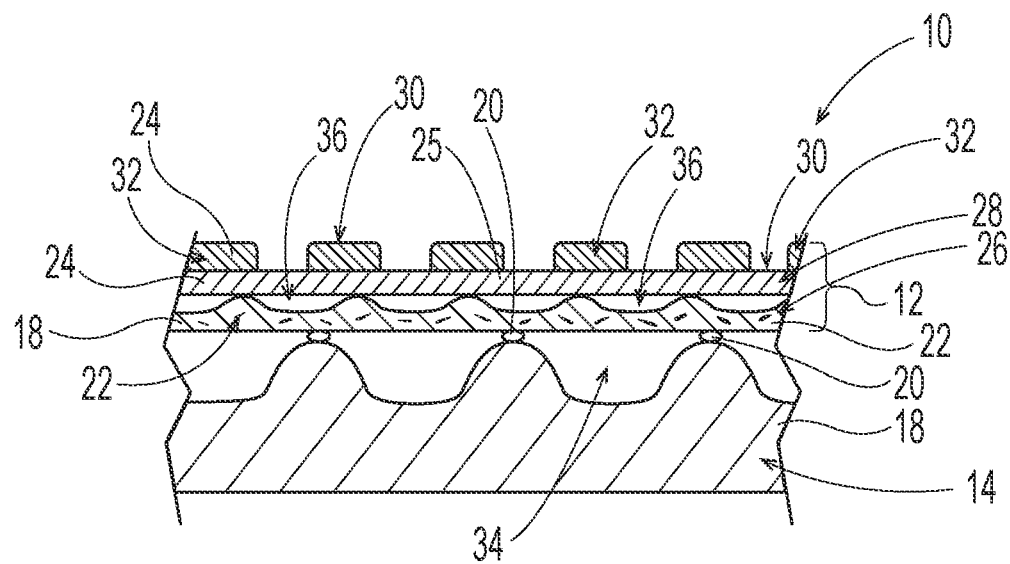
FIG. 1 is a cross-section representation of an example of a toilet tissue according to the present invention.

"Fibrous element" as used herein means an elongate particulate having a length greatly exceeding its average diameter, i.e. a length to average diameter ratio of at least about least about 10 and/or at least about 100 and/or at least about 1000 and/or up to 5000. A fibrous element may be a filament or a fiber. In one example, the fibrous element is a single fibrous element rather than a yarn comprising a plurality of fibrous elements.

The fibrous elements of the present invention may be spun from polymer melt compositions via suitable spinning operations, such as meltblowing and/or spunbonding and/or they may be obtained from natural sources such as vegetative sources, for example trees.

The fibrous elements of the present invention may be monocomponent and/or multicomponent. For example, the fibrous elements may comprise bicomponent fibers and/or filaments. The bicomponent fibers and/or filaments may be in any form, such as side-by-side, core and sheath, islands-in-the-sea and the like.

"Filament" as used herein means an elongate particulate as described above that exhibits a length of greater than or equal to 5.08 cm (2 in.) and/or greater than or equal to 7.62 cm (3 in.) and/or greater than or equal to 10.16 cm (4 in.) and/or greater than or equal to 15.24 cm (6 in.). The filament may exhibit a length to average diameter ratio of at least about 100 and/or at least about 1000 and/or up to 5000.

Filaments are typically considered continuous or substantially continuous in nature. Filaments are relatively longer than fibers. Non-limiting examples of filaments include meltblown and/or spunbond filaments. Non-limiting examples of polymers that can be spun into filaments include natural polymers, such as starch, starch derivatives, cellulose, such as rayon and/or lyocell, and cellulose derivatives, hemicellulose, hemicellulose derivatives, and synthetic polymers including, but not limited to polyvinyl alcohol filaments and/or polyvinyl alcohol derivative filaments, and thermoplastic polymer filaments, such as polyesters, nylons, polyolefins such as polypropylene filaments, polyethylene filaments, and biodegradable or compostable thermoplastic fibers such as polylactic acid filaments, polyhydroxyalkanoate filaments, polyesteramide filaments, and polycaprolactone filaments. The filaments may be monocomponent or multicomponent, such as bicomponent filaments.

"Fiber" as used herein means an elongate particulate as described above that exhibits a length of less than 5.08 cm (2 in.) and/or less than 3.81 cm (1.5 in.) and/or less than 2.54 cm (1 in.). The fiber may exhibit a length to average diameter ratio of less than about 100 and/or less than about 50 and/or less than about 25 and/or about 10.

Fibers are typically considered discontinuous in nature. Non-limiting examples of fibers include pulp fibers, such as wood pulp fibers, and synthetic staple fibers such as polypropylene, polyethylene, polyester, copolymers thereof, rayon, lyocell, glass fibers and polyvinyl alcohol fibers.

Staple fibers may be produced by spinning a filament tow and then cutting the tow into segments of less than 5.08 cm (2 in.) thus producing fibers; namely, staple fibers.

In one example of the present invention, a fiber may be a naturally occurring fiber, which means it is obtained from a naturally occurring source, such as a vegetative source, for example a tree and/or plant, such as trichomes. Such fibers are typically used in papermaking and are oftentimes referred to as papermaking fibers. Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to fibrous structures made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. Also applicable to the present invention are fibers derived from recycled paper, which may contain any or all of the above categories of fibers as well as other non-fibrous polymers such as fillers, softening agents, wet and dry strength agents, and adhesives used to facilitate the original papermaking.

In one example, the wood pulp fibers are selected from the group consisting of hardwood pulp fibers, softwood pulp fibers, and mixtures thereof. The hardwood pulp fibers may be selected from the group consisting of: tropical hardwood pulp fibers, northern hardwood pulp fibers, and mixtures thereof. The tropical hardwood pulp fibers may be selected from the group consisting of: *eucalyptus* fibers, acacia fibers, and mixtures thereof. The northern hardwood pulp fibers may be selected from the group consisting of: cedar fibers, maple fibers, and mixtures thereof.

In addition to the various wood pulp fibers, other cellulosic fibers such as cotton linters, rayon, lyocell, trichomes, seed hairs, and bagasse fibers can be used in this invention. Other sources of cellulose in the form of fibers or capable of being spun into fibers include grasses and grain sources.

"Trichome" or "trichome fiber" as used herein means an epidermal attachment of a varying shape, structure and/or function of a non-seed portion of a plant. In one example, a trichome is an outgrowth of the epidermis of a non-seed portion of a plant. The outgrowth may extend from an epidermal cell. In one embodiment, the outgrowth is a trichome fiber. The outgrowth may be a hairlike or bristlelike outgrowth from the epidermis of a plant.

Trichome fibers are different from seed hair fibers in that they are not attached to seed portions of a plant. For example, trichome fibers, unlike seed hair fibers, are not attached to a seed or a seed pod epidermis. Cotton, kapok, milkweed, and coconut coir are non-limiting examples of seed hair fibers.

Further, trichome fibers are different from nonwood bast and/or core fibers in that they are not attached to the bast, also known as phloem, or the core, also known as xylem portions of a nonwood dicotyledonous plant stem. Non-limiting examples of plants which have been used to yield nonwood bast fibers and/or nonwood core fibers include kenaf, jute, flax, ramie and hemp.

Further trichome fibers are different from monocotyledonous plant derived fibers such as those derived from cereal straws (wheat, rye, barley, oat, etc), stalks (corn, cotton, sorghum, *Hesperaloe funifera*, etc.), canes (bamboo, bagasse, etc.), grasses (esparto, lemon, sabai, switchgrass, etc), since such monocotyledonous plant derived fibers are not attached to an epidermis of a plant.

Further, trichome fibers are different from leaf fibers in that they do not originate from within the leaf structure. Sisal and abaca are sometimes liberated as leaf fibers.

Finally, trichome fibers are different from wood pulp fibers since wood pulp fibers are not outgrowths from the epidermis of a plant; namely, a tree. Wood pulp fibers rather originate from the secondary xylem portion of the tree stem.

"Fibrous structure" as used herein means a structure that comprises a web material comprising a plurality of fibrous elements, for example a plurality of fibers, such as a plurality of pulp fibers, such as wood pulp fibers and/or non-wood pulp fibers, for example plant fibers, synthetic staple fibers, and mixtures thereof. In addition to pulp fibers, the web material may comprise a plurality of filaments, such as polymeric filaments, for example thermoplastic filaments such as polyolefin filaments (i.e., polypropylene filaments), polyester filament, polyethylene terephthalate (PET) filaments and/or hydroxyl polymer filaments, for example polyvinyl alcohol filaments and/or polysaccharide filaments such as starch filaments, such as in the form of a coform web material where the fibers and filaments are commingled together and/or are present as discrete or substantially discrete layers within the web material. A web material according to the present invention means an orderly arrangement of fibers alone and/or with filaments within a structure in order to perform a function. A fibrous structure according to the present invention means an association of fibrous elements that together form a structure capable of performing a function. A fibrous structure may comprise a plurality of inter-entangled fibrous elements, for example inter-entangled filaments. Non-limiting examples of web materials of the present invention include paper.

Non-limiting examples of processes for making the web material of the fibrous structures of the present invention include known wet-laid papermaking processes, for example conventional wet-pressed (CWP) papermaking processes and structure paper-making processes, for example through-air-dried (TAD), both creped TAD and uncreped TAD, papermaking processes, fabric-creped papermaking processes, belt-creped papermaking processes, ATMOS papermaking processes, NTT papermaking processes, and air-laid papermaking processes. Such processes typically include steps of preparing a fiber composition in the form of a fiber suspension in a medium, either wet, more specifically aqueous medium, or dry, more specifically gaseous, i.e. with air as medium. The aqueous medium used for wet-laid processes is oftentimes referred to as a fiber slurry. The fiber slurry is then used to deposit a plurality of the fibers onto a forming wire, fabric, or belt such that an embryonic web material is formed, after which drying and/or bonding the fibers together results in a web material, for example the web material. Further processing of the web material may be carried out such that a finished web material is formed. For example, in typical papermaking processes, the finished web material is the web material that is wound on the reel at the end of papermaking, often referred to as a parent roll, and may subsequently be converted into a finished fibrous structure of the present invention, e.g. a single- or multi-ply fibrous structure and/or a single- or multi-ply toilet tissue.

The web material is a coformed web material comprising a plurality of filaments and a plurality of fibers commingled together as a result of a coforming process.

"Basis Weight" as used herein is the weight per unit area of a sample reported in lbs/3000 ft² or g/m² (gsm) and is measured according to the Basis Weight Test Method described herein.

"Machine Direction" or "MD" as used herein means the direction parallel to the flow of the fibrous structure through the fibrous structure making machine and/or toilet tissue manufacturing equipment.

"Cross Machine Direction" or "CD" as used herein means the direction parallel to the width of the fibrous structure making machine and/or toilet tissue manufacturing equipment and perpendicular to the machine direction.

"Ply" as used herein means an individual, integral fibrous structure.

"Plies" as used herein means two or more individual, integral fibrous structures disposed in a substantially contiguous, face-to-face relationship with one another, forming a multi-ply fibrous structure and/or multi-ply toilet tissue. It is also contemplated that an individual, integral fibrous structure can effectively form a multi-ply fibrous structure, for example, by being folded on itself.

"Embossed" as used herein with respect to a web material, a fibrous structure, and/or a toilet tissue means that a web material, a fibrous structure, and/or a toilet tissue has been subjected to a process which converts a smooth surfaced web material, fibrous structure, and/or toilet tissue to a decorative surface by replicating a design on one or more emboss rolls, which form a nip through which the web material, fibrous structure, and/or toilet tissue passes. Embossed does not include creping, microcreping, printing or other processes that may also impart a texture and/or decorative pattern to a web material, a fibrous structure, and/or a toilet tissue.

"Differential density", as used herein, means a web material that comprises one or more regions of relatively low fiber density, which are referred to as pillow regions, and one or more regions of relatively high fiber density, which are referred to as knuckle regions.

"Densified", as used herein means a portion of a fibrous structure and/or toilet tissue that is characterized by regions of relatively high fiber density (knuckle regions).

"Non-densified", as used herein, means a portion of a fibrous structure and/or toilet tissue that exhibits a lesser density (one or more regions of relatively lower fiber density) (pillow regions) than another portion (for example a knuckle region) of the fibrous structure and/or toilet tissue.

"Non-rolled" as used herein with respect to a fibrous structure and/or toilet tissue of the present invention means that the fibrous structure and/or toilet tissue is an individual sheet (for example not connected to adjacent sheets by perforation lines. However, two or more individual sheets may be interleaved with one another) that is not convolutedly wound about a core or itself.

"Creped" as used herein means creped off of a Yankee dryer or other similar roll and/or fabric creped and/or belt creped. Rush transfer of a fibrous structure alone does not result in a "creped" fibrous structure or "creped" toilet tissue for purposes of the present invention.

"Toilet tissue" as used herein means a soft, relatively low density fibrous structure, for example a multi-ply two or more or three or more fibrous structure plies useful as a wiping implement for post-urinary and post-bowel movement cleaning. The toilet tissue may be convolutedly wound upon itself about a core or without a core to form a toilet tissue roll (roll of toilet tissue) or may be in the form of discrete sheets. When in the form of a roll of toilet tissue, the roll of toilet tissue may exhibit a roll compressibility (% Compressibility) as measured according to the Roll Compressibility Test Method described herein of from about 4% to about 8% and/or from about 4% to about 7% and/or from about 4% to about 6%.

In one example, the toilet tissue of the present invention comprises one or more fibrous structures according to the present invention.

The toilet tissue and/or fibrous structures of the present invention making up the toilet tissue may exhibit a basis weight between about 1 g/m² to about 5000 g/m² and/or from about 10 g/m² to about 500 g/m² and/or from about 10 g/m² to about 300 g/m² and/or from about 10 g/m² to about 120 g/m² and/or from about 15 g/m² to about 110 g/m² and/or from about 20 g/m² to about 100 g/m² and/or from about 30 to 90 g/m² as determined by the Basis Weight Test Method described herein. In addition, the toilet tissue of the present invention may exhibit a basis weight between about 10 g/m² to about 120 g/m² and/or from about 10 g/m² to about 80 g/m² and/or from about 10 to about 60 g/m² and/or from about 10 g/m² to about 55 g/m² and/or from about 20 g/m² to about 55 g/m² as determined by the Basis Weight Test Method described herein.

The toilet tissue of the present invention may exhibit a total dry tensile strength of greater than about 59 g/cm (greater than about 150 g/in) and/or greater than about 78 g/cm (greater than about 200 g/in) and/or greater than about 98 g/cm (greater than about 250 g/in) and/or greater than about 138 g/cm (greater than about 350 g/in) and/or from about 78 g/cm (about 200 g/in) to about 394 g/cm (about 1000 g/in) and/or from about 98 g/cm (about 250 g/in) to about 335 g/cm (about 850 g/in). In addition, the toilet tissue of the present invention may exhibit a total dry tensile strength of greater than about 196 g/cm (greater than about 500 g/in) and/or from about 196 g/cm (about 500 g/in) to about 394 g/cm (about 1000 g/in) and/or from about 216 g/cm (about 550 g/in) to about 335 g/cm (about 850 g/in) and/or from about 236 g/cm (about 600 g/in) to about 315 g/cm (about 800 g/in). In one example, the toilet tissue exhibits a total dry tensile strength of less than about 394 g/cm (less than about 1000 g/in) and/or less than about 335 g/cm (less than about 850 g/in).

The toilet tissue of the present invention may exhibit a density of less than 0.60 g/cm³ and/or less than 0.30 g/cm³ and/or less than 0.20 g/cm³ and/or less than 0.15 g/cm³ and/or less than 0.10 g/cm³ and/or less than 0.07 g/cm³ and/or less than 0.05 g/cm³ and/or from about 0.01 g/cm³ to about 0.20 g/cm³ and/or from about 0.02 g/cm³ to about 0.15 g/cm³ and/or from about 0.02 g/cm³ to about 0.10 g/cm³.

The toilet tissue of the present invention may be in the form of toilet tissue rolls. Such toilet tissue rolls may comprise a plurality of connected, but perforated sheets of fibrous structure, that are separably dispensable from adjacent sheets.

The toilet tissue and/or fibrous structures making up the toilet tissue of the present invention may comprise additives such as softening agents, temporary wet strength agents, permanent wet strength agents, bulk softening agents, lotions, silicones, wetting agents, latexes, patterned latexes and other types of additives suitable for inclusion in and/or on toilet tissue.

"Hydroxyl polymer" as used herein includes any hydroxyl-containing polymer that can be incorporated into a filament of the present invention. In one example, the hydroxyl polymer of the present invention includes greater than 10% and/or greater than 20% and/or greater than 25% by weight hydroxyl moieties. In another example, the hydroxyl within the hydroxyl-containing polymer is not part of a larger functional group such as a carboxylic acid group.

"Chemically different" as used herein with respect to two hydroxyl polymers means that the hydroxyl polymers are at least different structurally, and/or at least different in properties and/or at least different in classes of chemicals, for example polysaccharides, such as starch, versus non-polysaccharides, such as polyvinyl alcohol, and/or at least different in their respective solubility parameters.

"Non-thermoplastic" as used herein means, with respect to a material, such as a fibrous element as a whole and/or a polymer, such as a crosslinked polymer, within a fibrous element, that the fibrous element and/or polymer exhibits no melting point and/or softening point, which allows it to flow under pressure, in the absence of a plasticizer, such as water, glycerin, sorbitol, urea and the like.

"Non-cellulose-containing" as used herein means that less than 5% and/or less than 3% and/or less than 1% and/or less than 0.1% and/or 0% by weight of cellulose polymer, cellulose derivative polymer and/or cellulose copolymer is present in fibrous element. In one example, "non-cellulose-containing" means that less than 5% and/or less than 3% and/or less than 1% and/or less than 0.1% and/or 0% by weight of cellulose polymer is present in fibrous element.

"Fast wetting surfactant" and/or "fast wetting surfactant component" and/or "fast wetting surfactant function" as used herein means a surfactant and/or surfactant component, such as an ion from a fast wetting surfactant, for example a sulfosuccinate diester ion (anion), that exhibits a Critical Micelle Concentration (CMC) of greater 0.15% by weight and/or at least 0.25% and/or at least 0.50% and/or at least 0.75% and/or at least 1.0% and/or at least 1.25% and/or at least 1.4% and/or less than 10.0% and/or less than 7.0% and/or less than 4.0% and/or less than 3.0% and/or less than 2.0% by weight.

"Polymer melt composition" or "Polysaccharide melt composition" as used herein means a composition comprising water and a melt processed polymer, such as a melt processed fibrous element-forming polymer, for example a melt processed hydroxyl polymer, such as a melt processed polysaccharide.

"Melt processed fibrous element-forming polymer" as used herein means any polymer, which by influence of elevated temperatures, pressure and/or external plasticizers may be softened to such a degree that it can be brought into a flowable state, and in this condition, may be shaped as desired.

"Melt processed hydroxyl polymer" as used herein means any polymer that contains greater than 10% and/or greater than 20% and/or greater than 25% by weight hydroxyl groups and that has been melt processed, with or without the aid of an external plasticizer. More generally, melt processed hydroxyl polymers include polymers, which by the influence of elevated temperatures, pressure and/or external plasticizers may be softened to such a degree that they can be brought into a flowable state, and in this condition, may be shaped as desired.

"Blend" as used herein means that two or more materials, such as a fibrous element-forming polymer, for example a hydroxyl polymer and a polyacrylamide are in contact with each other, such as mixed together homogeneously or non-homogeneously, within a filament. In other words, a filament formed from one material, but having an exterior coating of another material is not a blend of materials for purposes of the present invention. However, a fibrous element formed from two different materials is a blend of materials for purposes of the present invention even if the fibrous element further comprises an exterior coating of a material.

"Associate," "Associated," "Association," and/or "Associating" as used herein with respect to fibrous elements and/or with respect to a surface and/or surface material comprising fibrous elements, such as filaments, being associated with a fibrous structure and/or a web material and/or a layer being associated with another layer within a layered fibrous structure means combining, either in direct contact or in indirect contact, fibrous elements and/or a surface material with a web material such that a fibrous structure is formed. In other words, "layered" in this context means the fibrous structure is not made up of separate plies of fibrous structures or web materials that are laminated and/or adhesively bonded with one another to form a multi-ply fibrous structure, but rather is made up of a web material upon which a surface material (not in the form of a pre-formed web material, but rather in the form of fibrous elements, such as filaments) is deposited, directly or indirectly, onto the web material. In one example, the associated fibrous elements and/or associated surface material may be bonded to the web material, directly or indirectly, for example by adhesives and/or thermal bonds to form adhesive sites and/or thermal bond sites, respectively, within the fibrous structure. In another example, the fibrous elements and/or surface material may be associated with the web material, directly or indirectly, by being deposited onto the same web material making belt.

"Average Diameter" as used herein, with respect to a fibrous element, is measured according to the Average Diameter Test Method described herein. In one example, a fibrous element, for example a filament, of the present invention exhibits an average diameter of less than 50 μm and/or less than 25 μm and/or less than 20 μm and/or less than 15 μm and/or less than 10 μm and/or less than 6 μm and/or greater than 1 μm and/or greater than 3 μm.

"3D pattern" with respect to a fibrous structure and/or toilet tissue's surface in accordance with the present invention means herein a pattern that is present on at least one surface of the fibrous structure and/or toilet tissue. The 3D pattern texturizes the surface of the fibrous structure and/or toilet tissue, for example by providing the surface with protrusions and/or depressions. The 3D pattern on the surface of the fibrous structure and/or toilet tissue is made by making the toilet tissue or at least one fibrous structure ply employed in the toilet tissue on a patterned molding member that imparts the 3D pattern to the toilet tissue and/or fibrous structure plies made thereon.

"Water-resistant" as it refers to a surface pattern or part thereof means that a 3D pattern retains its structure and/or integrity after being saturated by water and the 3D pattern is still visible to a consumer. In one example, the 3D pattern may be water-resistant.

"Wet textured" as used herein means that a 3D patterned fibrous structure ply comprises texture (for example a three-dimensional topography) imparted to the fibrous structure and/or fibrous structure's surface during a fibrous structure making process. In one example, in a wet-laid fibrous structure making process, wet texture can be imparted to a fibrous structure upon fibers and/or filaments being collected on a collection device that has a three-dimensional (3D) surface which imparts a 3D surface to the fibrous structure being formed thereon and/or being transferred to a fabric and/or belt, such as a through-air-drying fabric and/or a patterned drying belt, comprising a 3D surface that imparts a 3D surface to a fibrous structure being formed thereon. In one example, the collection device with a 3D surface comprises a patterned, such as a patterned formed by a polymer or resin being deposited onto a base substrate, such as a fabric, in a patterned configuration. The wet texture imparted to a wet-laid fibrous structure is formed in the fibrous structure prior to and/or during drying of the fibrous structure. Non-limiting examples of collection devices and/or fabric and/or belts suitable for imparting wet texture to a fibrous structure include those fabrics and/or belts used in fabric creping and/or belt creping processes, for example as disclosed in U.S. Pat. Nos. 7,820,008 and 7,789,995, coarse through-air-drying fabrics as used in uncreped through-air-drying processes, and photo-curable resin patterned through-air-drying belts, for example as disclosed in U.S. Pat. No. 4,637,859. Wet texture is different from non-wet texture that is imparted to a fibrous structure after the fibrous structure has been dried, for example after the moisture level of the fibrous structure is less than 15% and/or less than 10% and/or less than 5%. An example of non-wet texture includes embossments imparted to a fibrous structure by embossing rolls during converting of the fibrous structure.

As used herein, the articles "a" and "an" when used herein, for example, "an anionic surfactant" or "a fiber" is understood to mean one or more of the material that is claimed or described.

All percentages and ratios are calculated by weight unless otherwise indicated. All percentages and ratios are calculated based on the total composition unless otherwise indicated.

Unless otherwise noted, all component or composition levels are in reference to the active level of that component or composition, and are exclusive of impurities, for example, residual solvents or by-products, which may be present in commercially available sources.

Toilet Tissue

Figure 2:
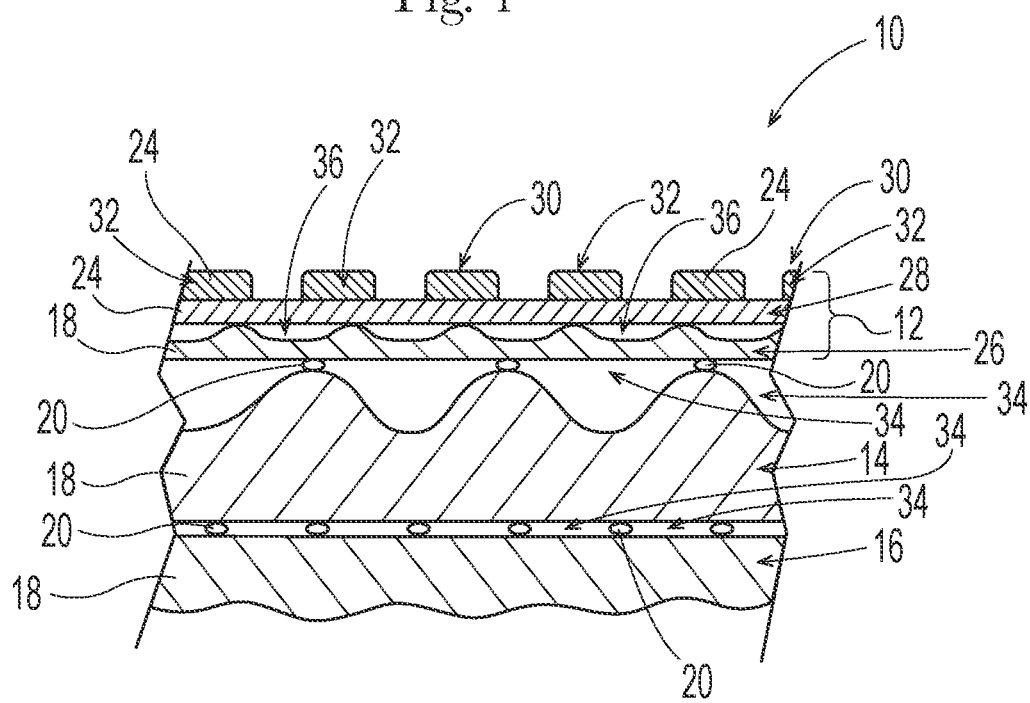
FIG. 2 is a cross-section representation of another example of a toilet tissue according to the present invention.

As shown in FIGS. 1 and 2, the toilet tissue of the present invention comprises two or more and/or three or more fibrous structure plies 12, 14, 16. At least two and/or at least three or more of the fibrous structure plies 12, 14, 16 are different from one another, for example in texture, caliper, basis weight, fibrous element (fibers and/or filaments) composition. At least two of the fibrous structure plies 12, 14, 16 may comprise a web material 18 that is the same as the other, for example the two outer web materials 18 in FIG. 2. Further, at least two or more and/or at least three of more of the fibrous structure plies 12, 14, 16 may be laminated and/or bonded together, for example adhesively bonded together, such as by a plybond glue 20, for example a hot melt glue and/or a cold glue. At least two of the fibrous structure plies 12, 14, 16 may be bonded together, for example adhesively bonded together in a pattern, for example a non-random repeating pattern and/or a stripe. At least three of the fibrous structure plies 12, 14, 16 may be bonded together, for example adhesively bonded together in a pattern, for example a non-random repeating pattern and/or a stripe. The toilet tissue of the present invention may comprise a first fibrous structure ply 12, which in FIGS. 1 and 2 is a layered fibrous structure ply, and a second fibrous structure ply 14 that are bonded together, for example adhesively bonded together in a first pattern and the third fibrous structure ply 16, when present, and second fibrous structure ply 14, may be bonded together, for example adhesively bonded together in a second pattern, which may be the same or different from the first pattern.

At least one of the fibrous structure plies 12, 14, 16 of the toilet tissue 10 of the present invention may comprise a layered fibrous structure ply 12 comprising one or more layers of fibers 22, for example pulp fibers, such as wood pulp fibers in the form of a web material 18, for example a layered wet-laid fibrous structure ply, such as a structured layered wet-laid fibrous structure ply. When the web material 18 comprises two or more layers of fibers 22, the fibers 22 of the layers may be different, for example one layer may comprise hardwood pulp fibers, such as *eucalyptus* fibers and the other layer may comprise softwood pulp fiber, such as NSK fibers. The layers of fibers 22 may be associated with one another to form a web material 18, for example a layered wet-laid fibrous structure ply, such as a structured, layered wet-laid fibrous structure ply.

At least one and/or at least two and/or at least three of the fibrous structure plies 12, 14, 16 of the toilet tissue 10 of the present invention may comprise a web material 18, which may be the same and/or different to one another. The toilet tissue 10 of the present invention may comprise a first web material 18 (fibrous structure ply 12), for example a wet-laid fibrous structure ply, such as a structured wet laid fibrous structure ply that exhibits a first caliper, a second web material 18 (fibrous structure ply 14), for example a wet-laid fibrous structure ply, such as a structured wet-laid fibrous structure ply that exhibits a second caliper, and a third web material 18 (fibrous structure ply 16), when present, for example a wet-laid fibrous structure ply, such as a structured wet-laid fibrous structure ply that exhibits a third caliper, wherein the first caliper, second caliper, and third caliper, when present, may be the same, different, and/or at least two may be different from one another and/or at least two may be the same as one another. The second web material (fibrous structure ply 14) may exhibit the highest caliper within the toilet tissue 10. The first, second, and third web materials 18 may each be layered fibrous structures, for example layered wet-laid fibrous structures, such as structured, layered wet-laid fibrous structures, and/or non-layered fibrous structures, for example non-layered wet-laid fibrous structures, such as structured, non-layered wet-laid fibrous structures, and/or a mix of layered fibrous structures, for example layered wet-laid fibrous structures, such as structured, layered wet-laid fibrous structures, and non-layered fibrous structures, for example non-layered wet-laid fibrous structures, such as structured, non-layered wet-laid fibrous structures.

The fibrous structure plies 12, 14, 16 and/or toilet tissues 10 of the present invention may be embossed and/or tufted that creates a three-dimensional surface pattern that provides aesthetics and/or improved cleaning properties. In one example, the emboss area may be greater than 10% and/or greater than 12% and/or greater than 15% and/or greater than 20% of the surface area of at least one surface of the toilet tissue.

It has unexpectedly been found that the toilet tissue of the present invention may exhibit a caliper of greater than 20.0 mils and/or at least about 22.0 mils and/or at least about 24.0 mils and/or at least about 26.0 mils and/or at least about 27.0 mils as measured according to the Caliper Test Method. The toilet tissue of the present invention may exhibit a caliper of from about 27.0 mils to about 32.0 mils and/or from about 27.0 mils to about 30.0 mils as measured according to the Caliper Test Method.

It has unexpectedly been found that the toilet tissue of the present invention may exhibit a CRT Capacity of greater than 15 g/g and/or at least about 17 g/g and/or at least about 19 g/g and/or at least about 20 g/g as measured according to the CRT Test Method. The toilet tissue of the present invention may exhibit a CRT Capacity of from about 20 g/g to about 28 g/g and/or of from about 20 g/g to about 25 g/g as measured according to the CRT Test Method.

It has unexpectedly been found that the toilet tissue of the present invention may exhibit exhibits a Plate Stiffness of less than about 10 N*mm and/or less than about 8 N*mm and/or less than about 7.70 N*m and/or less than about 6 N*mm as measured according to the Plate Stiffness Test Method. The toilet tissue may exhibit a Plate Stiffness of from about 1 N*m to less than 8 N*m and/or from about 4 to about 6 N*mm and/or from about 5 to about 6 N*mm as measured according to the Plate Stiffness Test Method.

The toilet tissue of the present invention may exhibit a CRT Rate of less than about 1.0 and/or less than about 0.7 and/or less than about 0.5 less than about 0.3 g/sec as measured according to the CRT Test Method.

The toilet tissue of the present invention may exhibit a Basis Weight of at least about 20 gsm and/or at least about 25 gsm and/or at least about 30 gsm and/or at least about 35 gsm and/or at least about 40 gsm and/or at least about 45 gsm and/or at least about 50 gsm and/or at least about 55 gsm as measured according to the Basis Weight Test Method. The toilet tissue may exhibit a Basis Weight of at least about 10 gsm to about 120 gsm and/or at least about 20 gsm to about 80 gsm as measured according to the Basis Weight Test Method. The toilet tissue may exhibit a Basis Weight of at least about 10 gsm to about 60 gsm and/or at least 10 gsm to about 55 gsm and/or at least about 20 gsm to about 55 gsm and/or at least about 25 gsm to about 55 gsm as measured according to the Basis Weight Test Method.

The toilet tissue of the present invention may be flushable and/or dispersible and/or suitable for municipal wastewater and sewer systems and/or septic systems.

The toilet tissue of the present invention may exhibit a Total Wet Decay of greater than 30% and/or greater than 40% and/or greater than 50% and/or greater than 60% as measured according to the Wet Decay Test Method.

The toilet tissue of the present invention may exhibit an Initial Total Wet Tensile of greater than 30 g/M and/or greater than 40 g/M and/or greater than 50 g/in and/or greater than 60 g/in as measured according to the Wet Tensile Test Method.

The toilet tissue of the present invention may exhibit a Total Dry Tensile of greater than 150 g/in and/or greater than about 200 g/in and/or greater than about 250 g/in and/or greater than about 350 g/in greater than about 500 g/in as measured according to the Dry Tensile Test Method. The toilet tissue may exhibit a Total Dry Tensile of from about 150 g/in to about 1000 g/in and/or from about 200 g/in to about 1000 g/in and/or from about 250 g/in to about 850 g/in and/or from about 350 g/in to about 850 g/in and/or from about 500 g/in to about 850 g/in as measured according to the Dry Tensile Test Method.

The toilet tissue of the present invention may exhibit a Flexural Rigidity of less than about 700 mg-cm and/or less than about 500 mg-cm and/or less than about 450 mg-cm and/or less than about 400 mg-cm as measured according to the Flexural Rigidity Test Method. The toilet tissue may exhibit a Flexural Rigidity of from about 500 mg-cm to about 100 mg-cm and/or from about 450 mg-cm to about 200 mg-cm and/or from about 400 mg-cm to about 300 mg-cm as measured according to the Flexural Rigidity Test Method.

The toilet tissue of the present invention may exhibit any combination of the properties described herein.

The toilet tissue of the present invention may comprise at least one fibrous structure ply comprising a structured fibrous structure ply, including structured fibrous structure plies formed on NTT and/or ATMOS papermaking lines, for example a through-air-dried fibrous structure ply, such as a creped through-air-dried fibrous structure ply or an uncreped through-air-dried fibrous structure ply.

The toilet tissue of the present invention may comprise at least one fibrous structure ply comprising a belt creped fibrous structure ply.

The toilet tissue of the present invention may comprise at least one fibrous structure ply comprising a fabric creped fibrous structure ply.

The toilet tissue of the present invention may comprise at least one fibrous structure ply comprising a conventional wet-pressed fibrous structure ply.

The toilet tissue of the present invention may comprise at least one fibrous structure ply comprising an embossed fibrous structure ply.

The toilet tissue of the present invention and/or at least one fibrous structure of the toilet tissue of the present invention may comprise at least one fibrous element, for example a fiber, such as a pulp fiber, which may be a wood pulp fiber.

The toilet tissue of the present invention and/or at least one fibrous structure of the toilet tissue of the present invention may comprise at least one fibrous element, for example a filament, such as a filament comprising a hydroxyl polymer, which may be a polysaccharide, such as a polysaccharide is selected from the group consisting of: starch, starch derivatives, cellulose derivatives, hemicellulose, hemicellulose derivatives, and mixtures thereof, more specifically starch. In one example, the hydroxyl polymer may comprise polyvinyl alcohol.

As shown in FIGS. 1 and 2, the toilet tissue 10 of the present invention and/or one or more fibrous structure plies 12, 14, 16 of the toilet tissue 10 of the present invention may comprise a plurality of fibers 22 and a plurality of filaments 24, such as filaments 24 comprising a hydroxyl polymer, for example a polysaccharide, such as starch. The toilet tissue 10 of the present invention may comprise a layered fibrous structure ply (first fibrous structure ply 12) comprising a first layer 26, for example a first web material 18, such as a wet-laid fibrous structure, comprising a plurality of fibers 22 and a second layer 28 comprising a plurality of filaments 24. The second layer 28 of the layered fibrous structure ply may form at least a portion of an exterior surface 30 and/or the entire exterior surface 30, if a third layer 32, which may be a scrim material, is not present, of the toilet tissue 10 comprising the layered fibrous structure ply.

A third layer 32, for example a scrim material, for example a plurality of filaments 24, such as filaments 24 comprising polyvinyl alcohol, may be present and/or deposited onto at least a portion of the second layer 28 comprising filaments 24, which are different from the filaments 24 of the third layer 32, of the layered fibrous structure ply.

As shown in FIGS. 1 and 2, the toilet tissue 10 of the present invention may comprise two or more and/or three or more fibrous structure plies 12, 14, 16. The toilet tissue 10 of the present invention may comprise two or more fibrous structure plies 12, 14 wherein a first fibrous structure ply 12, for example a layered fibrous structure ply comprising a first layer 26 comprising a plurality of fibers 22, for example pulp fibers, such as wood pulp fibers, which may be in the form of a first web material 18, for example a wet-laid fibrous structure, and a second layer 28, which may be in the form of spun filaments, comprising a plurality of filaments 24, for example filaments 24 comprising a hydroxyl polymer, which are deposited onto the first layer 26 according to the present invention. The filaments 24 of the second layer 28 may form at least a portion of an exterior surface 30 and/or the entire exterior surface 30 of the toilet tissue 10 comprising the layered fibrous structure ply. In addition, a third layer 32, for example a scrim material, for example filaments 24, such as filaments 24 comprising polyvinyl alcohol, may be present and/or deposited onto the second layer 28, wherein the third layer 32 forms at least a portion of the exterior surface 30 of the toilet tissue 10 comprising the layered fibrous structure ply.

The first fibrous structure ply 12 (layered fibrous structure ply) is adhesively bonded, for example by plybond glue 20, to a second fibrous structure ply 14, which may be a second web material 18. The second fibrous structure ply 14 of the toilet tissue 10 described immediately above may be in the form of a web material 18, for example a second web material 18, comprising a plurality of fibers 22, for example pulp fibers, such as wood pulp fibers. The second web material 18 may be a wet-laid fibrous structure according to the present invention. The multi-ply toilet tissues 10 (two-ply (FIG. 1) and three-ply (FIG. 2)) may comprise void space, for example interply void space 34. An interply void space 34 may be formed by a web material 18 of a fibrous structure ply 12, 14, 16 bridging a texture, such as depressions, channels, or protrusions, such as imparted to a surface of a web material 18 of an adjacent fibrous structure ply 12, 14, 16 by a patterned molding member, for example a patterned resin molding member and/or a through-air-drying fabric, such as a coarse through-air-drying fabric, for example as is used in the UCTAD process, and/or an embossing operation and/or a creping operation, such as a belt creping operation and/or a fabric creping operation and/or creping off a drying cylinder, such as a Yankee. The void spaces 34 of the toilet tissue 10 may be seen using different imaging tools, such as µCT.

Further, the first fibrous structure ply 12 (layered fibrous structure ply) may comprise void space, for example intraply void space 36. An intraply void space 36 may be formed by the second layer 28 of the layered fibrous structure ply bridging a texture, such as depressions, channels, or protrusions, such as imparted to a surface of the first web material 18 of the first layer 26 by a patterned molding member, for example a patterned resin molding member and/or a through-air-drying fabric, such as a coarse through-air-drying fabric, for example as is used in the UCTAD process, and/or an embossing operation and/or a creping operation, such as a belt creping operation and/or a fabric creping operation and/or creping off a drying cylinder, such as a Yankee. The void spaces 34 of the toilet tissue 10 may be seen using different imaging tools, such as µCT.

As shown in FIG. 2, the toilet tissue 10 of the present invention may comprise three or more fibrous structure plies 12, 14, 16 wherein a first fibrous structure ply 12, for example a layered fibrous structure ply comprising a first layer 26 comprising a plurality of fibers 22, for example pulp fibers, such as wood pulp fibers, which may be in the form of a first web material 18, for example a wet-laid fibrous structure, and a second layer 28, which may be in the form of spun filaments, comprising a plurality of filaments 24, for example filaments 24 comprising a hydroxyl polymer, which are deposited onto the first layer 26 according to the present invention, such that the first layer 26 (first web material 18) is adhesively bonded, for example by plybond glue 20, to a second fibrous structure ply 14, which is then ultimately adhesively bonded, for example by plybond glue 20, to a third fibrous structure ply 16, which may comprise a third web material 18, for example a wet-laid fibrous structure, to make the three-ply toilet tissue 10. The bond area between the first fibrous structure ply 12 and the second fibrous structure ply 14 may be greater than the bond area between the second fibrous structure ply 14 and the third fibrous structure ply 16. Similar to the interply void space 34 present between the first fibrous structure ply 12 and the second fibrous structure ply 14, interply void space 34 (the same, less, or more) may also exist between the second fibrous structure ply 14 and the third fibrous structure ply 16.

The second fibrous structure ply 14 of the toilet tissue 10 described immediately above may be in the form of a web material 18, for example a second web material 18, comprising a plurality of fibers 22, for example pulp fibers, such as wood pulp fibers. The second web material 18 may be a wet-laid fibrous structure according to the present invention.

The third fibrous structure ply 16 of the toilet tissue 10 described immediately above may be in the form of a web material 18, for example a third web material 18, comprising a plurality of fibers 22, for example pulp fibers, such as wood pulp fibers. The third web material 18 may be a wet-laid fibrous structure according to the present invention.

The toilet tissue 10 comprises a least one exterior surface 30, for example a consumer-contacting surface, that comes into contact with a consumer during use, such as during wiping. The exterior surface 30 of the toilet tissue 10 may comprise and/or be defined by at least a portion of the first fibrous structure ply 12 (layered fibrous structure ply).

The toilet tissue may be a wet fibrous structure, for example a toilet tissue comprising a liquid composition.

In addition, the toilet tissue of the present invention and/or fibrous structure plies of the toilet tissue may be non-lotioned and/or may not contain a post-applied surface chemistry. The toilet tissue of the present invention and/or fibrous structure plies of the toilet tissue may be creped or uncreped. The toilet tissue of the present invention and/or fibrous structure plies of the toilet tissue may be uncreped fibrous structure plies. An exterior surface of the toilet tissue of the present invention and/or fibrous structure plies of the toilet tissue may not be creped (uncreped and/or non-undulating and/or not creped off a surface, such as a Yankee), however the any of the web materials making up the fibrous structure plies may be creped (undulating and/or creped off a surface, such as a Yankee).

Layered Fibrous Structure

As shown in FIGS. 1 and 2, the first layer 26 of the layered fibrous structure may be a first web material 18 of the present invention. The first web material 18 may itself be layered, for example a layered wet-laid fibrous structure. The first web material 18 of the first layer 26 may comprise a plurality of naturally-occurring fibrous elements, for example fibers 22, such as pulp fibers that exhibit a length of less than 5.08 cm and/or less than 3.81 cm and/or less than 3 cm and/or less than 2.54 cm and/or less than 1 cm and/or less than 8 mm and/or less than 5 mm.

The second layer 28 of the layered fibrous structure may comprise a plurality of fibrous elements, for example filaments 24, for example spun filaments and/or non-naturally occurring filaments 240, for example hydroxyl polymer filaments. The filaments 24 of the second layer may exhibit a length of 5.08 cm or greater and/or 7.62 cm or greater and/or 10.16 cm or greater and/or 15.24 cm or greater. The filaments 24 of the second layer 28 may form a surface material on a surface of the first web material 18 of the first layer 26. The filaments 24 of the second layer 28 may be in the form of a web material 18 after being deposited onto the first web material 18 of the first layer 26.

The filaments 24 of the second layer 28 may comprise a pre-formed web material that is associated with the first web material 18 of the first layer 26 in a multi-ply configuration.

The filaments 24 of the second layer 28, which may form a surface material on the first web material 18 of the first layer 26, may be associated with the first web material 18 by bonding, such as thermal bonds and/or adhesive bond sites. The filaments 24 of the second layer 28 may be bonded to the first web material 18 of the first layer 26 at an edge-to-edge bond distance measured between two bond sites of at least 1 mm and/or at least 1.5 mm and/or at least 1.8 mm and/or at least 2 mm and/or at least 2.5 mm and/or at least 2.5 mm and/or at least 3 mm such that the filaments 24 of the second layer 28 are movable because they are relatively unbonded and form a movable, unbonded exterior surface 30, for example a surface that exhibits a bounded mobility, of the toilet tissue 10.

The filaments 24 of the second layer 28 may comprise hydroxyl polymer filaments, for example starch and/or starch derivative filaments, present at a level of greater than 2.5 gsm and/or greater than 3 gsm and/or greater than 3.5 gsm and/or greater than 4 gsm and/or greater than 4.5 gsm and/or less than 40 gsm and/or less than 35 gsm and/or less than 25 gsm and/or less than 20 gsm and/or less than 15 gsm and/or less than 12 gsm and/or less than 10 gsm and/or from about 2.5 gsm to about 15 gsm and/or from about 3 gsm to about 12 gsm and/or from about 3.5 gsm to about 10 gsm and/or from about 4 gsm to about 10 gsm.

The fibers 22 of the first layer 26 (first web material 18) may be present at a level of greater than 6 and/or greater than 8 and/or greater than greater than 10 and/or greater than 12 and/or greater than 14 and/or greater than 16 and/or at least 18 and/or less than 55 and/or less than 50 and/or less than 40 and/or less than 35 and/or less than 30 and/or less than 25 gsm.

The filaments 24 of the second layer 28 may comprise a crosslinked polymer, for example crosslinked starch and/or starch derivative and/or crosslinked polyvinyl alcohol, crosslinked by a first crosslinking agent, such as dihydroxyethyleneurea, and the first web material 18 of the first layer 26 may comprise a second crosslinking agent different from the first crosslinking agent, such as a crosslinking agent that crosslinks its fibrous elements together, such as temporary wet strength crosslinking agents utilized in toilet tissue, for example polyamide-epichlorohydrin chemistries.

The third layer 32, when present, may mitigate and/or prevent pilling of the filaments 24 of the second layer 28 (surface material) during use by a consumer. The third layer 32 may comprise a plurality of filaments 24, which are different from the filaments 24 of the second layer 28. When present, the filaments 24 of the third layer 32 may be present at a weight level of less than the weight level of the filaments 24 of the second layer 28. The filaments 24 of the third layer 28 may be present at a basis weight of from about 0.10 gsm to about 5 gsm and/or 0.15 gsm to about 5 gsm and/or from about 0.20 gsm to about 5 gsm and/or from about 0.25 gsm to about 5 gsm and/or from about 0.5 gsm to about 4 gsm and/or from about 1 gsm to about 3 gsm and the filaments 24 of the second layer 28 may be present at a basis weight of greater than 6 gsm and/or greater than 8 gsm and/or greater than 9 gsm and/or greater than 10 gsm and/or from about 10 gsm to about 40 gsm and/or to about 25 gsm. The filaments 24 of the third layer 32 may comprise a hydroxyl polymer different from the hydroxyl polymer of the filaments 24 of the second layer 28. The filaments 24 of the third layer 32 may comprise polyvinyl alcohol and the filaments 24 of the second layer 28 may comprise a polysaccharide, for example starch and/or a starch derivative.

The filaments 24 of the third layer 32 may comprise a hydroxyl polymer, for example a non-polysaccharide, such as polyvinyl alcohol and/or a polymer that exhibits a solubility parameter greater than 16.0 $MPa^{1/2}$ and/or greater than 17.0 $MPa^{1/2}$ and/or greater than 18.0 $MPa^{1/2}$ and/or greater than 18.8 $MPa^{1/2}$ and/or greater than 19.0 $MPa^{1/2}$ and/or greater than 20.0 $MPa^{1/2}$ and less than 25.6 $MPa^{1/2}$ and/or less than 25.0 $MPa^{1/2}$ and/or less than 24.0 $MPa^{1/2}$ and/or less than 23.0 $MPa^{1/2}$.

Figure 3:
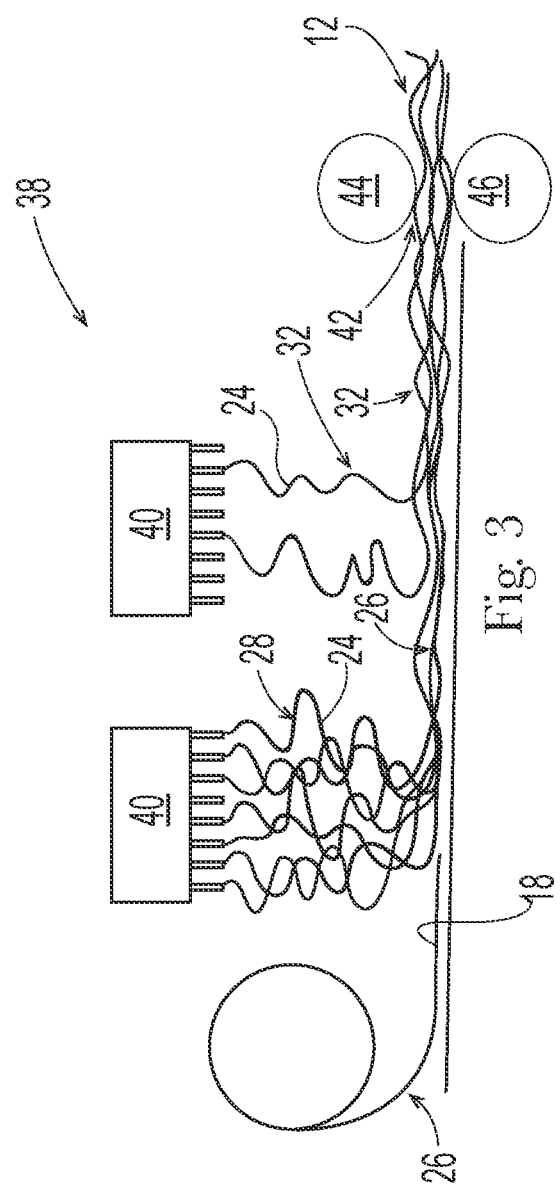
FIG. 3 is a schematic representation of a method for making a layered fibrous structure according to the present invention.

The layered fibrous structure ply (first fibrous structure ply 12) may be made by the fibrous structure making process 38 shown in FIG. 3 by providing a first layer 26 comprising a first web material 18 comprising a plurality of fibrous elements, for example fibers 22, and depositing a second layer 28, for example a plurality of fibrous elements, for example filaments 24, from one or more and/or two or more filament sources 40, such as a die, for example a meltblow die, such as a multi-row capillary die to form a layer of inter-entangled filaments 24, onto at least one surface of the first web material 18 to form the a layered fibrous structure. When a third layer 32 is applied to the filaments 24 of second layer 28, at least one of the filament sources 40 deposits the filaments 24 of the third layer 32 such that at least a portion of the filaments 24 of the second layer 28 is positioned between the first web material 18 of the first layer 26 and the filaments 24 of the third layer 32. The layered fibrous structure making process 38 may further comprise the step of associating the filaments 24 of the second layer 28 to the first web material 18 of the first layer 26 such as by bonding, for example creating thermal bonds by passing the filaments 24 of the second layer 28 riding on the first web material 18 of the first layer 26 through a nip 42 formed by a patterned thermal bond roll 44 and a flat roll 46. The fibrous structure making process 38 may optionally comprise the step of winding the layered fibrous structure ply (first fibrous structure ply 12) into a roll, such as a parent roll for unwinding in a converting operation to cut the roll into consumer-useable sized toilet tissue rolls and/or emboss the fibrous structure and/or perforate the fibrous structure into consumer-useable sized sheets of toilet tissue. In addition, the roll of fibrous structure may be combined with another fibrous structure ply, the same or different as the roll of fibrous structure to make a multi-ply toilet tissue according to the present invention, an example of which is shown in FIGS. 1 and 2.

In addition, the layered fibrous structure ply (first fibrous structure ply 12) of the present invention may be non-lotioned and/or may not contain a post-applied surface chemistry (in other words, the layered fibrous structure may be void of surface chemistries). In another example, the layered fibrous structures of the present invention may be lotioned and/or may contain a post-applied surface chemistry. In another example, the layered fibrous structures of the present invention may be creped or uncreped. In one example, the layered fibrous structures of the present invention are uncreped fibrous structures.

In addition to the layered fibrous structure ply (first fibrous structure ply 12) of the present invention exhibiting improved surface properties as described herein, such layered fibrous structures also may exhibit improved cleaning properties, for example bowel movement cleaning properties, compared to known fibrous structures, for example known fibrous structures comprising hydroxyl polymer filaments and known fibrous structures, such as wet-laid and/or air-laid, comprising cellulose fibers, for example pulp fibers.

Without wishing to be bound by theory, it is believed that the layered fibrous structures of the present invention exhibit improved skin benefit and/or glide on skin properties and/or cleaning properties due to the hydroxyl polymer fibrous elements of the present invention exhibiting greater absorbency, without a gooey feel, than pulp fibers, and therefore facilitates better, in reality and/or perception, absorption of bowel movement and/or urine more completely and/or faster than known fibrous structures. In addition, it is believed that the layered fibrous structures of the present invention that comprise a plurality of hydroxyl polymer fibrous elements, for example hydroxyl polymer filaments in an exterior layer, such as a scrim layer, provides an improved absorbency, without a gooey feel, than known fibrous structures, such that the hydroxyl polymer fibrous elements during use contact the user's skin surface and trap and/or lock in the bowel movement or portions thereof. Further, it is believed that the fibrous structures of the present invention that comprise a plurality of hydroxyl polymer fibrous elements, for example hydroxyl polymer filaments in an exterior layer that provide improved surface properties permits a user to apply more force to the fibrous structure during use because the hydroxyl polymer fibrous elements provide a cushion and/or buffer compared to known fibrous structures, especially known wet-laid and/or air-laid fibrous structures that consist or consist essentially of pulp fibers.

The layered fibrous structure ply (first fibrous structure ply 12) of the present invention may be embossed and/or tufted that creates a three-dimensional surface pattern that provides aesthetics and/or improved cleaning properties. The level of improved cleaning properties relates to the % contact area under a load, such as a user's force applied to the fibrous structure during wiping, and/or % volume/area under a load, such as a user's force applied to the fibrous structure during wiping, created by the three-dimensional surface pattern on the surface of the fibrous structure. In one example, the emboss area may be greater than 10% and/or greater than 12% and/or greater than 15% and/or greater than 20% of the surface area of at least one surface of the fibrous structure.

Fibrous Elements of Second Layer

The fibrous elements of the second layer of the present invention may be produced from a polymer melt composition, for example a hydroxyl polymer melt composition such as an aqueous hydroxyl polymer melt composition, comprising a hydroxyl polymer, such as an uncrosslinked starch for example a dent corn starch, an acid-thinned starch, a waxy starch, and/or a starch derivative such as an ethoxylated starch, a crosslinking system comprising a crosslinking agent, such as an imidazolidinone, and water. The hydroxyl polymer may exhibit a weight average molecular weight in the range of 50,000 g/mol to 40,000,000 g/mol as measured according to the Weight Average Molecular Weight Test Method described herein. In one example, the crosslinking agent comprises less than 2% and/or less than 1.8% and/or less than 1.5% and/or less than 1.25% and/or 0% and/or about 0.25% and/or about 0.50% by weight of a base, for example triethanolamine. It has unexpectedly been found that the reducing the level of base in the crosslinking agent used in the polymer melt composition results in more effective crosslinking. In one example, the fibrous elements of the present invention comprise greater than 25% and/or greater than 40% and/or greater than 50% and/or greater than 60% and/or greater than 70% to about 95% and/or to about 90% and/or to about 80% by weight of the fibrous element of a hydroxyl polymer, such as starch, which may be in a crosslinked state. In one example, the fibrous element comprises an ethoxylated starch and an acid thinned starch, which may be in their crosslinked states.

The fibrous elements of the second layer and optionally, the third layer, may exhibit an average diameter of less than 50 µm and/or less than 25 µm and/or less than 20 µm and/or less than 15 µm and/or less than 10 µm and/or greater than 1 µm and/or greater than 3 µm and/or from about 3-10 µm and/or from about 3-8 µm and/or from about 5-7 µm as measured according to the Average Diameter Test Method described herein. When present, the fibrous elements of the third layer exhibit smaller average diameters, for example from about 1 to about 3 µm, than the fibrous elements of the second layer.

The fibrous elements may also comprise a crosslinking agent, such as an imidazolidinone, such as dihydroxyethyleneurea (DHEU), which may be in its crosslinked state (crosslinking the hydroxyl polymers present in the fibrous elements) at a level of from about 0.25% and/or from about 0.5% and/or from about 1% and/or from about 2% and/or from about 3% and/or to about 10% and/or to about 7% and/or to about 5.5% and/or to about 4.5% by weight of the fibrous element. In addition to the crosslinking agent, the fibrous element may comprise a crosslinking facilitator that aids the crosslinking agent at a level of from 0% and/or from about 0.3% and/or from about 0.5% and/or to about 2% and/or to about 1.7% and/or to about 1.5% by weight of the fibrous element.

The fibrous elements of the second layer, for example hydroxyl polymer filaments, may comprise a crosslinked hydroxyl polymer, such as a crosslinked starch and/or starch derivative.

The fibrous elements of the second layer may also comprise a surfactant, such as a sulfosuccinate surfactant. A non-limiting example of a suitable sulfosuccinate surfactant comprises Aerosol® AOT (a sodium dioctyl sulfosuccinate) and/or Aerosol® MA-80 (a sodium dihexyl sulfosuccinate), which are commercially available from Cytec. The surfactant, such as a sulfosuccinate surfactant, may be present at a level of from 0% and/or from about 0.1% and/or from about 0.3% to about 2% and/or to about 1.5% and/or to about 1.1% and/or to about 0.7% by weight of the fibrous element.

The fibrous elements of the second layer may also comprise a weak acid, such as malic acid. The malic acid may be present at a level from 0% to 1% and/or from by weight of the fibrous element.

In addition to the crosslinking agent, the fibrous elements may comprise a crosslinking facilitator such as ammonium salts of methanesulfonic acid, ethanesulfonic acid, propanesulfonic acid, isopropylsulfonic acid, butanesulfonic acid, isobutylsulfonic acid, sec-butylsulfonic acids, benzenesulfonic acid, toluenesulfonic acid, xylenesulfonic acid, cumenesulfonic acid, alkylbenzenesulfonic, alkylnaphthalenedisulfonic acids.

The fibrous elements may also comprise a polymer selected from the group consisting of: polyacrylamide and its derivatives; acrylamide-based copolymers, polyacrylic acid, polymethacrylic acid, and their esters; polyethyleneimine; copolymers made from mixtures of monomers of the aforementioned polymers; and mixtures thereof at a level of from 0% and/or from about 0.01% and/or from about 0.05% and/or to about 0.5% and/or to about 0.3% and/or to about 0.2% by weight of the fibrous element. Such polymers may exhibit a weight average molecular weight of greater than 500,000 g/mol. In one example, the fibrous element comprises polyacrylamide.

The fibrous elements may also comprise various other ingredients such as propylene glycol, sorbitol, glycerin, and mixtures thereof.

One or more hueing agents, such as Violet CT may also be present in the polymer melt composition and/or fibrous elements formed therefrom.

In one example, the fibrous elements, of the present invention comprise a fibrous element-forming polymer, such as a hydroxyl polymer, for example a crosslinked hydroxyl polymer. In one example, the fibrous elements may comprise two or more fibrous element-forming polymers, such as two or more hydroxyl polymers. In another example, the fibrous element may comprise two or more fibrous element-forming polymers, such as two or more hydroxyl polymers, at least one of which is starch and/or a starch derivative. In still another example, the fibrous elements of the present invention may comprise two or more fibrous element-forming polymers at least one of which is a hydroxyl polymer and at least one of which is a non-hydroxyl polymer.

In yet another example, the fibrous elements of the present invention may comprise two or more non-hydroxyl polymers. In one example, at least one of the non-hydroxyl polymers exhibits a weight average molecular weight of greater than 1,400,000 g/mol and/or is present in the fibrous elements at a concentration greater than its entanglement concentration (CO and/or exhibits a polydispersity of greater than 1.32. In still another example, at least one of the non-hydroxyl polymers comprises an acrylamide-based copolymer.

In one example, the fibrous element comprises a filament. In another example, the fibrous element comprises a fiber, such as a filament that has been cut into fibers.

The fibrous elements of the second layer may be produced from a polymer melt composition. The polymer melt composition, for example an aqueous polymer melt composition such as an aqueous hydroxyl polymer melt composition, of the present invention comprises a melt processed fibrous element-forming polymer, such as a melt processed hydroxyl polymer, and a fast wetting surfactant according to the present invention.

The polymer melt compositions may have a temperature of from about 50° C. to about 100° C. and/or from about 65° C. to about 95° C. and/or from about 70° C. to about 90° C. when spinning fibrous elements from the polymer melt compositions.

In one example, the polymer melt composition of the present invention may comprise from about 30% and/or from about 40% and/or from about 45% and/or from about 50% to about 75% and/or to about 80% and/or to about 85% and/or to about 90% and/or to about 95% and/or to about 99.5% by weight of the polymer melt composition of a fibrous element-forming polymer, such as a hydroxyl polymer. The fibrous element-forming polymer, such as a hydroxyl polymer, may have a weight average molecular weight greater than 100,000 g/mol In one example, the fibrous elements of the present invention produced via a polymer processing operation may be cured at a curing temperature of from about 110° C. to about 260° C. and/or from about 110° C. to about 230° C. and/or from about 120° C. to about 200° C. and/or from about 130° C. to about 185° C. for a time period of from about 0.01 and/or 1 and/or 5 and/or 15 seconds to about 60 minutes and/or from about 20 seconds to about 45 minutes and/or from about 30 seconds to about 30 minutes. Alternative curing methods may include radiation methods such as UV, e-beam, IR and other temperature-raising methods.

Further, the fibrous elements may also be cured at room temperature for days, either after curing at above room temperature or instead of curing at above room temperature.

The fibrous elements of the second layer may include melt spun fibers and/or spunbond fibers, staple fibers, hollow fibers, shaped fibers, such as multi-lobal fibers and multi-component fibers, especially bicomponent fibers. The multicomponent fibers, especially bicomponent fibers, may be in a side-by-side, sheath-core, segmented pie, ribbon, islands-in-the-sea configuration, or any combination thereof. The sheath may be continuous or non-continuous around the core. The ratio of the weight of the sheath to the core can be from about 5:95 to about 95:5. The fibers of the present invention may have different geometries that include round, elliptical, star shaped, rectangular, and other various eccentricities.

Web Material

The web material, for example the first web material and/or second web material and/or third web material, may comprise a plurality of fibrous elements, for example a plurality of fibers, such as greater than 80% and/or greater than 90% and/or greater than 95% and/or greater than 98% and/or greater than 99% and/or 100% by weight of the web material of fibers.

The web material may comprise a plurality of naturally-occurring fibers, for example pulp fibers, such as wood pulp fibers (hardwood and/or softwood pulp fibers). In another example, the web material comprises a plurality of non-naturally occurring fibers (synthetic fibers), for example staple fibers, such as rayon, lyocell, polyester fibers, polycaprolactone fibers, polylactic acid fibers, polyhydroxyalkanoate fibers, and mixtures thereof. In another example, the web material comprises a mixture of naturally-occurring fibers, for example pulp fibers, such as wood pulp fibers (hardwood and/or softwood pulp fibers) and a plurality of non-naturally occurring fibers (synthetic fibers), for example staple fibers, such as rayon, lyocell, polyester fibers, polycaprolactone fibers, polylactic acid fibers, polyhydroxyalkanoate fibers, and mixtures thereof.

The web material may comprise a wet laid fibrous structure ply, such as a through-air-dried fibrous structure ply, for example an uncreped, through-air-dried fibrous structure ply and/or a creped, through-air-dried fibrous structure ply.

The web material, for example a wet laid fibrous structure ply may exhibit substantially uniform density.

The web material, for example a wet laid fibrous structure ply may exhibit differential density.

The web material, for example a wet laid fibrous structure ply may comprise a surface pattern.

The web material, for example a wet laid fibrous structure ply may comprise a conventional wet-pressed fibrous structure ply. The wet laid fibrous structure ply may comprise a fabric-creped fibrous structure ply. The wet laid fibrous structure ply may comprise a belt-creped fibrous structure ply.

The web material may comprise an air laid fibrous structure ply.

The web materials of the present invention may comprise a surface softening agent or be void of a surface softening agent, such as silicones, quaternary ammonium compounds, lotions, and mixtures thereof. The toilet tissue and/or web material of the toilet tissue may comprise a non-lotioned web material, for example the first web material.

The web materials of the present invention may comprise trichome fibers or may be void of trichome fibers.

Patterned Molding Members

The web materials of the present invention may be formed on patterned molding members, for example coarse through-air-drying fabrics, such as UCTAD fabrics, patterned resin-containing molding members, patterned rollers, patterned belt-creping molding members, patterned fabric-creping molding members, other patterned papermaking clothing, that result in the web materials, for example structured web materials, such as structure fibrous structures of the present invention. The pattern molding member may comprise a non-random repeating pattern. The pattern molding member may comprise a resinous pattern.

The web material may comprise a textured surface. The web material may comprise a surface comprising a three-dimensional (3D) pattern, for example a 3D pattern imparted to the web material by a patterned molding member. Non-limiting examples of suitable patterned molding members include patterned felts, patterned forming wires, patterned rolls, patterned fabrics, and patterned belts utilized in conventional wet-pressed papermaking processes, air-laid papermaking processes, and/or wet-laid papermaking processes that produce 3D patterned toilet tissue and/or 3D patterned fibrous structure plies employed in toilet tissue. Other non-limiting examples of such patterned molding members include through-air-drying fabrics and through-air-drying belts utilized in through-air-drying papermaking processes that produce through-air-dried fibrous structures, for example 3D patterned through-air dried fibrous structures, and/or through-air-dried toilet tissue comprising the web material, for example the first web material.

The web material 12 may comprise a 3D patterned web material having a surface comprising a 3D pattern.

The web material may be made by any suitable method, such as wet-laid, air laid, coform, hydroentangling, carding, meltblowing, spunbonding, and mixtures thereof. In one example the method for making the web material of the present invention comprises the step of depositing a plurality of fibers onto a collection device, such as a 3D patterned molding member such that a web material is formed.

A "reinforcing element" may be a desirable (but not necessary) element in some examples of the molding member, serving primarily to provide or facilitate integrity, stability, and durability of the molding member comprising, for example, a resinous material. The reinforcing element can be fluid-permeable or partially fluid-permeable, may have a variety of embodiments and weave patterns, and may comprise a variety of materials, such as, for example, a plurality of interwoven yarns (including Jacquard-type and the like woven patterns), a felt, a plastic, other suitable synthetic material, or any combination thereof.

Figure 4:
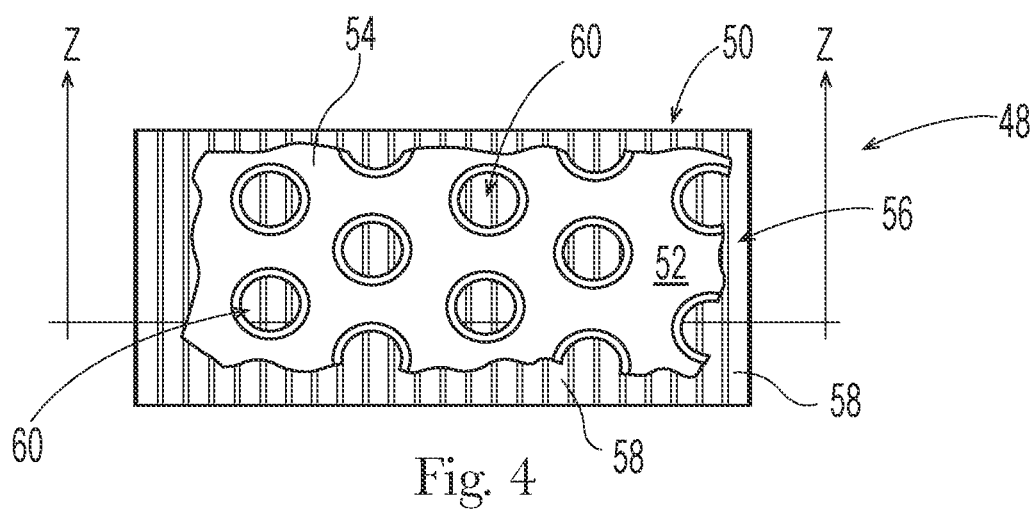
FIG. 4 is a top plan view of a patterned molding member according to the present invention.
Figure 5:
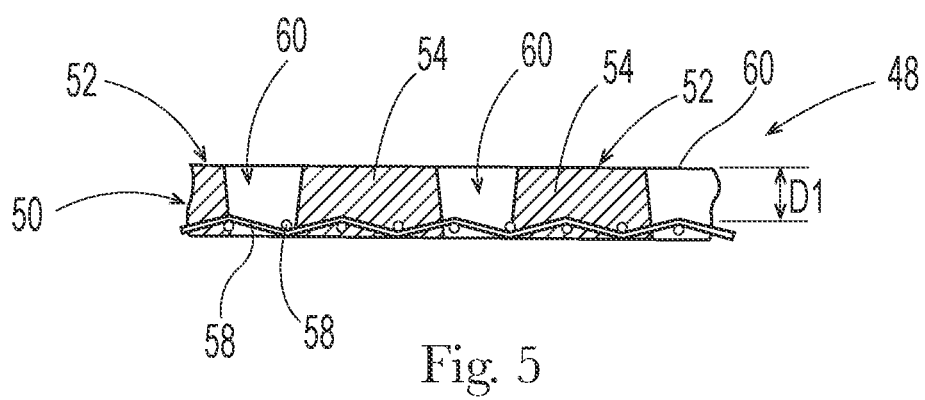
FIG. 5 is a cross-section view of the patterned molding member of FIG. 4 taken along line 5-5.

As shown in FIGS. 4 and 5, a non-limiting example of a patterned molding member 48, in this case a through-air-drying belt, suitable for use in the present invention comprises a continuous network knuckle 52 formed by a resin 54 arranged in a non-random, repeating pattern supported on a support fabric 56 comprising filaments 58. The continuous network knuckle 52 of resin 54 comprises deflection conduits 60 into which portions of a web material being made on the patterned molding member 48 deflect thus imparting the pattern of the patterned molding member 48 to the web material resulting in a structured web material and/or structure fibrous structure for use in the toilet tissue of the present invention. The deflected portions of the web material result in pillows, for example lower density regions compared to other parts of the web material, within the structured web material and/or structured fibrous structure and/or structured fibrous structure ply. The continuous network knuckle 52, in this case, and other forms and/or shapes, discrete and/or continuous knuckles impart knuckles, for example higher density regions compared to other parts of the web material, such as pillows.

As shown in FIG. 5, the resin 54 may be present on the support fabric 56 at a height DI of greater than 5.0 mils and/or greater than 7.0 mils and/or greater than 8.0 mils and/or greater than 10.0 mils and/or greater than 12.0 mils and/or greater than 13.0 mils and/or greater than 15.0 mils and/or greater than 17.0 mils and/or greater than 20.0 mils in order to define deflection conduits 60 that impart one or more pillows within a structured web material that exhibit similar heights, which when incorporated into the toilet tissue of the present invention results in the toilet tissue exhibiting the thick, absorbent, and/or flexible properties of the present invention.

Non-limiting Examples of Making Web Material

The web materials of the present invention may be made by any suitable papermaking process, such as conventional wet press papermaking process, through-air-dried papermaking process, belt-creped papermaking process, fabric-creped papermaking process, creped papermaking process, uncreped papermaking process, coform process, and air-laid process, so long as the web material comprises a plurality of fibers. In one example, the web material is made on a molding member of the present invention is used to make the web material of the present invention. The method may be a web material making process that uses a cylindrical dryer such as a Yankee (a Yankee-process) or it may be a Yankeeless process as is used to make substantially uniform density and/or uncreped web materials (fibrous structures). Alternatively, the web materials may be made by an air-laid process and/or meltblown and/or spunbond processes and any combinations thereof so long as the web materials of the present invention are made thereby.

Figure 6:
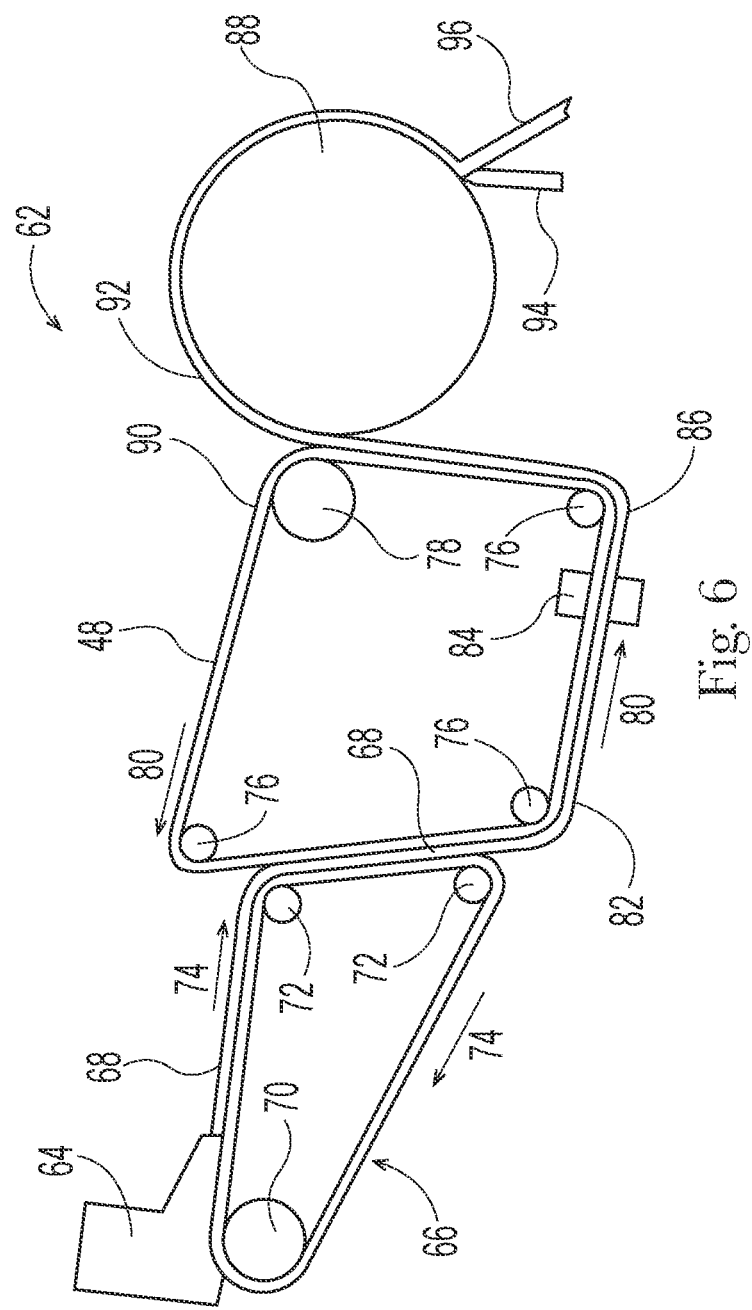
FIG. 6 is a schematic representation of a method for making a web material according to the present invention.

As shown in FIG. 6, one example of a process and equipment, represented as 62 for making a web material, for example a structure web material and/or structure fibrous structure ply according to the present invention comprises supplying an aqueous dispersion of fibers (a fibrous furnish or fiber slurry) to a headbox 64 which can be of any convenient design. From headbox 64 the aqueous dispersion of fibers is delivered to a first foraminous member 66 which is typically a Fourdrinier wire, to produce an embryonic fibrous structure 68.

The first foraminous member 66 may be supported by a breast roll 70 and a plurality of return rolls 72 of which only two are shown. The first foraminous member 66 can be propelled in the direction indicated by directional arrow 74 by a drive means, not shown. Optional auxiliary units and/or devices commonly associated fibrous structure making machines and with the first foraminous member 66, but not shown, include forming boards, hydrofoils, vacuum boxes, tension rolls, support rolls, wire cleaning showers, and the like.

After the aqueous dispersion of fibers is deposited onto the first foraminous member 66, embryonic fibrous structure (embryonic web material) 68 is formed, typically by the removal of a portion of the aqueous dispersing medium by techniques well known to those skilled in the art. Vacuum boxes, forming boards, hydrofoils, and the like are useful in effecting water removal. The embryonic fibrous structure 68 may travel with the first foraminous member 66 about return roll 72 and is brought into contact with a patterned molding member 48, such as a 3D patterned through-air-drying belt as shown in FIGS. 4 and 5. While in contact with the patterned molding member 48, the embryonic fibrous structure 68 will be deflected, rearranged, and/or further dewatered.

The patterned molding member 48 may be in the form of an endless belt. In this simplified representation, the patterned molding member 48 passes around and about patterned molding member return rolls 76 and impression nip roll 78 and may travel in the direction indicated by directional arrow 80. Associated with patterned molding member 48, but not shown, may be various support rolls, other return rolls, cleaning means, drive means, and the like well-known to those skilled in the art that may be commonly used in fibrous structure making machines.

After the embryonic fibrous structure 68 has been associated with the patterned molding member 48, fibers within the embryonic fibrous structure 68 are deflected into pillows and/or pillow network (deflection conduits 60 shown in FIGS. 4 and 5) present in the patterned molding member 48. In one example of this process step, there is essentially no water removal from the embryonic fibrous structure 68 through the deflection conduits 60 after the embryonic fibrous structure 68 has been associated with the patterned molding member 48 but prior to the deflecting of the fibers (portions of the web material) into the deflection conduits 60. Further water removal from the embryonic fibrous structure 68 can occur during and/or after the time the fibers are being deflected into the deflection conduits 60. Water removal from the embryonic fibrous structure 68 may continue until the consistency of the embryonic fibrous structure 68 associated with patterned molding member 48 is increased to from about 25% to about 35%. Once this consistency of the embryonic fibrous structure 68 is achieved, then the embryonic fibrous structure 68 can be referred to as an intermediate fibrous structure (intermediate web material) 82. During the process of forming the embryonic fibrous structure 68, sufficient water may be removed, such as by a noncompressive process, from the embryonic fibrous structure 68 before it becomes associated with the patterned molding member 48 so that the consistency of the embryonic fibrous structure 68 may be from about 10% to about 30%.

While applicants decline to be bound by any particular theory of operation, it appears that the deflection of the fibers in the embryonic fibrous structure and water removal from the embryonic fibrous structure begin essentially simultaneously. Embodiments can, however, be envisioned wherein deflection and water removal are sequential operations. Under the influence of the applied differential fluid pressure, for example, the fibers may be deflected into the deflection conduit with an attendant rearrangement of the fibers. Water removal may occur with a continued rearrangement of fibers. Deflection of the fibers, and of the embryonic fibrous structure, may cause an apparent increase in surface area of the embryonic fibrous structure. Further, the rearrangement of fibers may appear to cause a rearrangement in the spaces or capillaries existing between and/or among fibers.

It is believed that the rearrangement of the fibers can take one of two modes dependent on a number of factors such as, for example, fiber length. The free ends of longer fibers can be merely bent in the space defined by the deflection conduit while the opposite ends are restrained in the region of the ridges. Shorter fibers, on the other hand, can actually be transported from the region of the ridges into the deflection conduit (The fibers in the deflection conduits will also be rearranged relative to one another). Naturally, it is possible for both modes of rearrangement to occur simultaneously.

As noted, water removal occurs both during and after deflection; this water removal may result in a decrease in fiber mobility in the embryonic fibrous structure. This decrease in fiber mobility may tend to fix and/or freeze the fibers in place after they have been deflected and rearranged. Of course, the drying of the fibrous structure in a later step in the process of this invention serves to more firmly fix and/or freeze the fibers in position.

Any convenient means conventionally known in the papermaking art can be used to dry the intermediate fibrous structure 82. Examples of such suitable drying process include subjecting the intermediate fibrous structure 82 to conventional and/or flow-through dryers and/or Yankee dryers.

In one example of a drying process, the intermediate fibrous structure 82 in association with the patterned molding member 48 passes around the patterned molding member return roll 76 and travels in the direction indicated by directional arrow 80. The intermediate fibrous structure 82 may first pass through an optional predryer 84. This predryer 84 can be a conventional flow-through dryer (hot air dryer) well known to those skilled in the art. Optionally, the predryer 84 can be a so-called capillary dewatering apparatus. In such an apparatus, the intermediate fibrous structure 82 passes over a sector of a cylinder having preferential-capillary-size pores through its cylindrical-shaped porous cover. Optionally, the predryer 84 can be a combination capillary dewatering apparatus and flow-through dryer. The quantity of water removed in the predryer 84 may be controlled so that a predried fibrous structure 86 exiting the predryer 84 has a consistency of from about 30% to about 98%. The predried fibrous structure 86, which may still be associated with patterned molding member 48, may pass around another patterned molding member return roll 76 as it travels to an impression nip roll 78. As the predried fibrous structure 86 passes through the nip formed between impression nip roll 78 and a surface of a Yankee dryer 88, the pattern formed by the top surface 90 of the patterned molding member 48 is impressed into the predried fibrous structure 86 to form a structured fibrous structure (structured web material), for example a 3D patterned fibrous structure (3D patterned web material) 92. The structured fibrous structure 92 can then be adhered to the surface of the Yankee dryer 88 where it can be dried to a consistency of at least about 95%.

The structured fibrous structure 92 can then be foreshortened by creping the structured fibrous structure 92 with a creping blade 94 to remove the structured fibrous structure 92 from the surface of the Yankee dryer 88 resulting in the production of a structured creped fibrous structure (structured creped web material) 96 in accordance with the present invention. As used herein, foreshortening refers to the reduction in length of a dry (having a consistency of at least about 90% and/or at least about 95%) fibrous structure which occurs when energy is applied to the dry fibrous structure in such a way that the length of the fibrous structure is reduced and the fibers in the fibrous structure are rearranged with an accompanying disruption of fiber-fiber bonds. Foreshortening can be accomplished in any of several well-known ways. One common method of foreshortening is creping. The structured creped fibrous structure 96 may be used as is as a structure fibrous structure ply in the toilet tissue of the present invention or it may be subjected to post processing steps such as calendaring, tuft generating operations, and/or embossing and/or converting to form a structured fibrous structure ply and then used in the toilet tissue of the present invention.

Non-Limiting Examples of Fibrous Structures

The materials used in the Examples below are as follows:

Amioca starch is a waxy corn starch with a weight average molecular weight greater than 30,000,000 g/mol supplied by Ingredion.

Hyperfloc NF301, a nonionic polyacrylamide (PAAM) has a weight average molecular weight between 5,000,000 and 6,000,000 g/mol, is supplied by Hychem, Inc., Tampa, FL.

Aerosol OT-70 is an anionic sodium dihexyl sulfosuccinate surfactant supplied by Cytec Industries, Inc., Woodland Park, NJ Malic acid and ammonium methanesufonate are supplied as 10 wt % and 35 wt % solutions respectively from Calvary Industries, Fairfield, OH.

Example 1—Layered Fibrous Structure (w/o Third Layer) (First Fibrous Structure Ply)

A layered fibrous structure is prepared as follows. In a 40:1 APV Baker twin-screw extruder with eight temperature zones, Amioca starch is mixed with ammonium methanesulfonate, Aerosol OT-70 surfactant, malic acid and water in zone 1. This mixture is then conveyed down the barrel through zones 2 through 8 and cooked into a melt-processed hydroxyl polymer composition. The composition in the extruder is 35% water where the make-up of solids is 99% Amioca, 0.5% Aerosol OT-70, 0.7% ammonium methansulfonate, 0.1% malic acid. The extruder barrel temperature setpoints for each zone are shown below.

| Zone | 1 | 2 | 3 | 4 | 5 | 6 | 7 | 8 |
|---|---|---|---|---|---|---|---|---|
| Temperature (° F.) | 60 | 60 | 60 | 120 | 320 | 320 | 320 | 320 |

The temperature of the melt exiting the 40:1 extruder is between 320 and 330° F. From the extruder, the melt is fed to a Mahr gear pump, and then delivered to a second extruder. The second extruder is a 13:1 APV Baker twin screw, which serves to cool the melt by venting a stream to atmospheric pressure. The second extruder also serves as a location for additives to the hydroxyl polymer melt. Particularly, a stream of 2.2 wt % Hyperfloc NF301 polyacrylamide is introduced at a level of 0.1% on a solids basis. The material that is not vented is conveyed down the extruder to a second Mahr melt pump. From here, the hydroxyl polymer melt is delivered to a series of static mixers where a cross-linker and water are added. The melt composition at this point in the process is 55-60% total solids. On a solids basis the melt is comprised of 92.4% Amioca starch, 5.5% cross-linker, 1.0% ammonium methanesulfonate, 1.0% surfactant, 0.1% Hyperfloc NF301, and 0.1% malic acid. From the static mixers the composition is delivered to a melt blowing spinneret via a melt pump.

A plurality of starch filaments is attenuated with a saturated air stream to form a layer of filaments that are collected on top of one another to form a starch filament layer, which may be a starch web material or starch nonwoven substrate. The starch filament layer exhibits a basis weight of 4.8 g/m$^2$ and is formed on top of an 18.1 g/m$^2$ wet-laid pulp fibrous structure or wet-laid pulp web material produced as described in Example 7 below. The starch filament/wet-laid pulp web material layered fibrous structure is then subjected to a thermal bonding process wherein thermal bond sites are formed between the starch filament layer and the wet-laid pulp web material. The thermal bond roll has a diamond shaped pattern with 13% bond area, and results in a 0.075 in. distance between bond sites in the layered fibrous structure. After thermal bonding, the starch filament/wet-laid pulp web material layered fibrous structure is then cured at a curing temperature of from about 110° C. to about 260° C. for a time period of from about 0.01 and/or 1 and/or 5 and/or 15 seconds to about 60 minutes and/or from about 20 seconds to about 45 minutes and/or from about 30 seconds to about 30 minutes.

The finished layered fibrous structure is then wound about a core to produce a parent roll.

Example 2—Layered Fibrous Structure (w/ Third Layer) (First Fibrous Structure Ply)

A layered fibrous structure is prepared according to Example 1 except a third layer (a scrim layer) of polyvinyl alcohol filaments are formed onto the top of the starch filament/wet-laid pulp layered fibrous structure.

The polyvinyl alcohol filaments are prepared by the following procedure. Mowiol 10-98 polyvinyl alcohol (98% hydrolysis Kuraray) having a weight average molecular weight of 50,000 g/mol and water are added into a scraped, wall pressure vessel equipped with an overhead agitator in order to target a 35 wt % polyvinyl alcohol melt. The 35 wt % solution is cooked under pressure at 240° F. for 4 hours until the resulting melt is homogenous and transparent. The Mowiol 10-98 polyvinyl alcohol melt is pumped via gear pump to a static mixer where a cross-linker and cross-linker activator are added. From the static mixer the melt is delivered to a melt blowing spinneret.

A plurality of polyvinyl alcohol filaments is attenuated with a saturated air stream to form a layer of polyvinyl alcohol filaments of 0.15 g/m$^2$ that are collected on top of a starch filament/wet-laid pulp web material layered fibrous structure made according to Example 1. The resulting layered fibrous structure from top to bottom is 0.15 g/m$^2$ polyvinyl alcohol filaments/8 g/m$^2$ starch filaments/21 g/m$^2$ wet-laid pulp web material. The resulting layered fibrous structure is then subjected to a thermal bonding process wherein thermal bond sites are formed between the polyvinyl alcohol filament layer, the starch filament layer, and the wet-laid pulp web material. The thermal bond roll has a diamond shaped pattern with 13% bond area, and results in a 0.075 in. distance between bond sites in the layered fibrous structure. The finished layered fibrous structure is then wound about a core to produce a parent roll.

Example 3—Layered Fibrous Structure (w/ Third Layer) (First Fibrous Structure Ply)

A polyvinyl alcohol filament/starch filament/wet-laid pulp web material layered fibrous structure is prepared according to Example 2 except a higher basis weight of polyvinyl alcohol filaments is present in the polyvinyl alcohol filament layer.

A plurality of polyvinyl alcohol filaments is attenuated with a saturated air stream to form a layer of polyvinyl alcohol filaments of 0.70 g/m$^2$ that are collected on top of a starch filament/wet-laid pulp web material layered fibrous structure. The resulting layered substrate from top to bottom is 0.70 g/m$^2$ polyvinyl alcohol filaments/8 g/m$^2$ starch filaments/21 g/m$^2$ wet-laid pulp web material layered fibrous structure. The resulting layered fibrous structure is then subjected to a thermal bonding process wherein thermal bond sites are formed between the polyvinyl alcohol filament layer, the starch filament layer, and the wet-laid pulp web material. The thermal bond roll has a circle shaped pattern with 10.3% bond area, and results in a 0.094 in. distance between bond sites in the layered fibrous structure. The finished layered fibrous structure is then wound about a core to produce a parent roll.

Example 4—Layered Fibrous Structure (w/ Third Layer) (First Fibrous Structure Ply)

A polyvinyl alcohol filament/starch filament/wet-laid pulp web material layered fibrous structure is prepared according to Example 2 except a higher basis weight of polyvinyl alcohol filaments is present in the polyvinyl alcohol filament layer and the polyvinyl alcohol exhibits a lower weight average molecular weight.

The polyvinyl alcohol filaments are prepared by the following procedure. Poval 4-98 polyvinyl alcohol (98% hydrolysis from Kuraray) having a weight average molecular weight of 25,000 g/mol and water are added into a scraped, wall pressure vessel equipped with an overhead agitator in order to target a 50 wt % polyvinyl alcohol melt. The 50 wt % solution is cooked under pressure at 240° F. for 4 hours until the resulting melt is homogenous and transparent. The Poval 4-98 polyvinyl alcohol melt is pumped via gear pump to a static mixer where a cross-linker and cross-linker activator are added. From the static mixer the melt is delivered to a melt blowing spinneret.

A plurality of polyvinyl alcohol filaments is attenuated with a saturated air stream to form a layer of polyvinyl alcohol filaments of 1.0 g/m² that are collected on top of a starch filament/wet-laid pulp web material layered fibrous structure. The resulting layered fibrous structure from top to bottom is 1.0 g/m² polyvinyl alcohol filaments/8 g/m² starch filaments/21 g/m² wet-laid pulp web material layered fibrous structure. The resulting layered fibrous structure is then subjected to a thermal bonding process wherein thermal bond sites are formed between the polyvinyl alcohol filament layer, the starch filament layer, and the wet-laid pulp web material. The thermal bond roll has a circle shaped pattern with 10.3% bond area, and results in a 0.094 in. distance between bond sites in the layered fibrous structure. The finished layered fibrous structure is then wound about a core to produce a parent roll.

Example 5—Layered Fibrous Structure (w/ Third Layer) (First Fibrous Structure Ply)

A layered fibrous structure according to the present invention is prepared as follows. A polyvinyl alcohol filament/starch filament/wet-laid pulp web material layered fibrous structure is prepared similar to Example 2 except for basis weights and the starch filaments and polyvinyl alcohol filaments are melt blown onto a wet-laid pulp web material having a flat, smooth, soft, non-textured surface, which is ultimately converted into a 3-ply product. The resulting layered fibrous structure from top to bottom is 0.15 g/m² polyvinyl alcohol filaments/4 g/m² starch filaments/13 g/m² wet-laid pulp web material layered fibrous structure. This layered fibrous structure is then subjected to a thermal bonding process wherein thermal bond sites are formed between the polyvinyl alcohol filament layer, the starch filament layer, and the wet-laid pulp web material. The thermal bond roll has a diamond shaped pattern with 10% bond area, and a 0.056 in. distance between bond sites in the layered fibrous structure. The finished layered fibrous structure is then wound about a core to produce a parent roll.

Example 6—Web Material (Second Fibrous Structure Ply)

The following Example illustrates a non-limiting example for a preparation of a web material for use in the toilet tissue of the present invention, for example as the second fibrous structure ply of the toilet tissue, on a pilot-scale Fourdrinier fibrous structure making (papermaking) machine.

An aqueous slurry of *eucalyptus* (Fibria Brazilian bleached hardwood kraft pulp) pulp fibers is prepared at about 3% fiber by weight using a conventional repulper, then transferred to the hardwood fiber stock chest. The *eucalyptus* fiber slurry of the hardwood stock chest is pumped through a stock pipe to a hardwood fan pump where the slurry consistency is reduced from about 3% by fiber weight to about 0.15% by fiber weight. The 0.15% *eucalyptus* slurry is then pumped and equally distributed in the top and bottom chambers of a multi-layered, three-chambered headbox of a Fourdrinier wet-laid papermaking machine.

Additionally, an aqueous slurry of NSK (Northern Softwood Kraft) pulp fibers is prepared at about 3% fiber by weight using a conventional repulper, then transferred to the softwood fiber stock chest. The NSK fiber slurry of the softwood stock chest is pumped through a stock pipe to be refined to a Canadian Standard Freeness (CSF) of about 630. The refined NSK fiber slurry is then directed to the NSK fan pump where the NSK slurry consistency is reduced from about 3% by fiber weight to about 0.15% by fiber weight. The 0.15% *eucalyptus* slurry is then directed and distributed to the center chamber of a multi-layered, three-chambered headbox of a Fourdrinier wet-laid papermaking machine.

The wet-laid papermaking machine has a layered headbox having a top chamber, a center chamber, and a bottom chamber where the chambers feed directly onto the forming wire (Fourdrinier wire). The *eucalyptus* fiber slurry of 0.15% consistency is directed to the top headbox chamber and bottom headbox chamber. The NSK fiber slurry is directed to the center headbox chamber. All three fiber layers are delivered simultaneously in superposed relation onto the Fourdrinier wire to form thereon a three-layer embryonic fibrous structure (web material), of which about 38% of the top side is made up of the *eucalyptus* fibers, about 38% is made of the *eucalyptus* fibers on the bottom side and about 24% is made up of the NSK fibers in the center. Dewatering occurs through the Fourdrinier wire and is assisted by a deflector and wire table vacuum boxes. The Fourdrinier wire is an 84M (84 by 76 5A, Albany International). The speed of the Fourdrinier wire is about 750 feet per minute (fpm).

Figure 7:
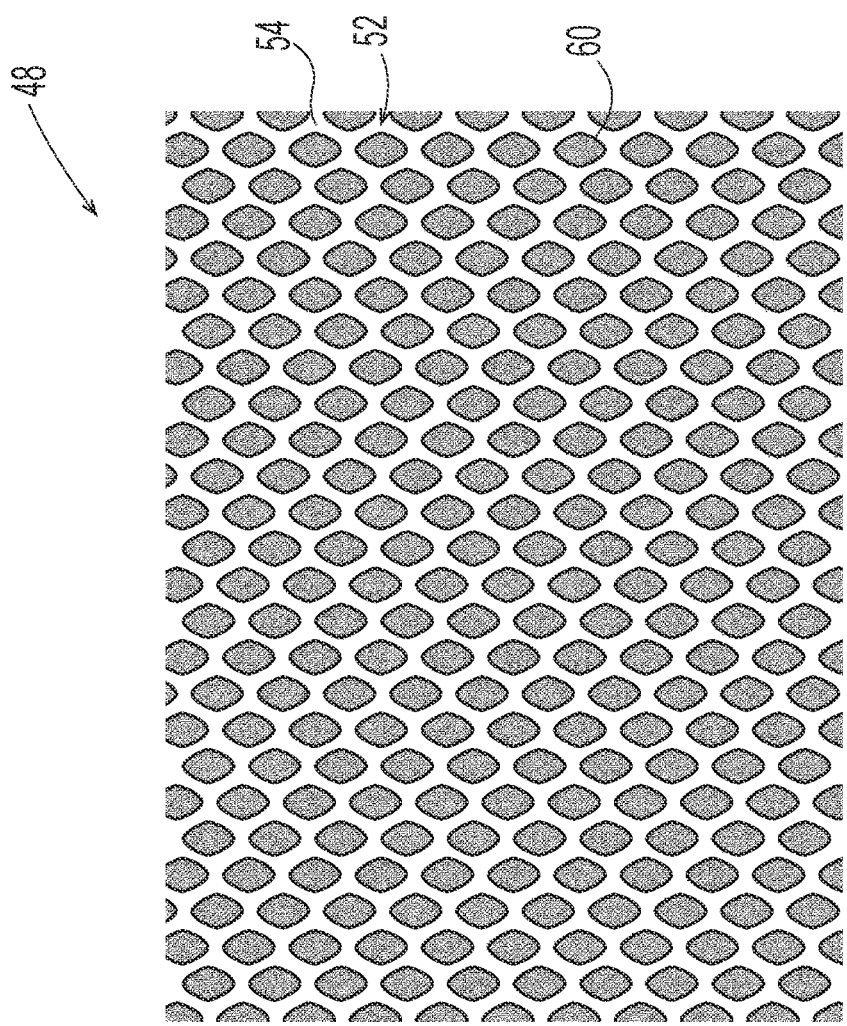
FIG. 7 is a top plan view of another patterned molding member according to the present invention.

The embryonic wet fibrous structure is transferred from the Fourdrinier wire, at a fiber consistency of about 15% at the point of transfer, to a patterned molding member, for example a 3D patterned through-air-drying belt similar to that shown in FIG. 7 having a cell count (deflection conduits—the discrete elements in this case) of 250 per square inch (knuckle area of about 30%) and a resin height of 13.6 mils resulting in a fibrous structure caliper of about 14.0 mils. The speed of the patterned molding member is the same as the speed of the Fourdrinier wire. The patterned molding member is designed to yield a fibrous structure (web material) comprising a pattern of high density continuous knuckle region with low density pillow regions dispersed throughout the continuous knuckle region.

Further de-watering of the fibrous structure is accomplished by vacuum assisted drainage until the fibrous structure has a fiber consistency of about 20% to 30%.

While remaining in contact with the patterned molding member, the fibrous structure is pre-dried by air blow-through pre-dryers to a fiber consistency of about 53% by weight.

After the pre-dryers, the semi-dry fibrous structure is transferred to a Yankee dryer and adhered to the surface of the Yankee dryer with a sprayed creping adhesive. The creping adhesive is an aqueous dispersion with the actives consisting of about 80% polyvinyl alcohol (PVA 88-50), about 20% CREPETROL® 457T20. CREPETROL® 457T20 is commercially available from Hercules Incorporated of Wilmington, DE The creping adhesive is delivered to the Yankee surface at a rate of about 0.15% adhesive solids based on the dry weight of the fibrous structure. The fiber consistency is increased to about 97% before the fibrous structure is dry-creped from the Yankee with a doctor blade.

The doctor blade has a bevel angle of about 25° and is positioned with respect to the Yankee dryer to provide an impact angle of about 81°. The Yankee dryer is operated at a temperature of about 275° F. and a speed of about 800 fpm. The fibrous structure is wound in a roll (parent roll) using a surface driven reel drum having a surface speed of about 757 fpm. The basis weight of this fibrous structure (web material) is about 15 gsm and has a total dry tensile of about 240 W/in.

Example 7—Web Material (Third Fibrous Structure Ply, when Present)

The following Example illustrates a non-limiting example for a preparation of a web material for use in the toilet tissue of the present invention, for example as the second fibrous structure ply of the toilet tissue, on a pilot-scale Fourdrinier fibrous structure making (papermaking) machine.

An aqueous slurry of *eucalyptus* (Fibria Brazilian bleached hardwood kraft pulp) pulp fibers is prepared at about 3% fiber by weight using a conventional repulper, then transferred to the hardwood fiber stock chest. The *eucalyptus* fiber slurry of the hardwood stock chest is pumped through a stock pipe to a hardwood fan pump where the slurry consistency is reduced from about 3% by fiber weight to about 0.15% by fiber weight. The 0.15% *eucalyptus* slurry is then pumped and equally distributed in the top and bottom chambers of a multi-layered, three-chambered headbox of a Fourdrinier wet-laid papermaking machine.

Additionally, an aqueous slurry of NSK (Northern Softwood Kraft) pulp fibers is prepared at about 3% fiber by weight using a conventional repulper, then transferred to the softwood fiber stock chest. The NSK fiber slurry of the softwood stock chest is pumped through a stock pipe to be refined to a Canadian Standard Freeness (CSF) of about 630. The refined NSK fiber slurry is then directed to the NSK fan pump where the NSK slurry consistency is reduced from about 3% by fiber weight to about 0.15% by fiber weight. The 0.15% *eucalyptus* slurry is then directed and distributed to the center chamber of a multi-layered, three-chambered headbox of a Fourdrinier wet-laid papermaking machine.

The wet-laid papermaking machine has a layered headbox having a top chamber, a center chamber, and a bottom chamber where the chambers feed directly onto the forming wire (Fourdrinier wire). The *eucalyptus* fiber slurry of 0.15% consistency is directed to the top headbox chamber and bottom headbox chamber. The NSK fiber slurry is directed to the center headbox chamber. All three fiber layers are delivered simultaneously in superposed relation onto the Fourdrinier wire to form thereon a three-layer embryonic fibrous structure (web material), of which about 38% of the top side is made up of the *eucalyptus* fibers, about 38% is made of the *eucalyptus* fibers on the bottom side and about 24% is made up of the NSK fibers in the center. Dewatering occurs through the Fourdrinier wire and is assisted by a deflector and wire table vacuum boxes. The Fourdrinier wire is an 84M (84 by 76 5A, Albany International). The speed of the Fourdrinier wire is about 750 feet per minute (fpm).

The embryonic wet fibrous structure is transferred from the Fourdrinier wire, at a fiber consistency of about 15% at the point of transfer, to a patterned molding member, for example a 3D patterned through-air-drying belt similar to that shown in FIG. 7 having a cell count (deflection conduits—the discrete elements in this case) of 562 per square inch (knuckle area of about 48%) and a resin height of 8.9 mils resulting in a fibrous structure caliper of about 11.0 mils. The speed of the patterned molding member is the same as the speed of the Fourdrinier wire. The patterned molding member is designed to yield a fibrous structure (web material) comprising a pattern of high density continuous knuckle region with low density pillow regions dispersed throughout the continuous knuckle region.

Further de-watering of the fibrous structure is accomplished by vacuum assisted drainage until the fibrous structure has a fiber consistency of about 20% to 30%.

While remaining in contact with the patterned molding member, the fibrous structure is pre-dried by air blow-through pre-dryers to a fiber consistency of about 53% by weight.

After the pre-dryers, the semi-dry fibrous structure is transferred to a Yankee dryer and adhered to the surface of the Yankee dryer with a sprayed creping adhesive. The creping adhesive is an aqueous dispersion with the actives consisting of about 80% polyvinyl alcohol (PVA 88-50), about 20% CREPETROL® 457T20. CREPETROL® 457T20 is commercially available from Hercules Incorporated of Wilmington, DE The creping adhesive is delivered to the Yankee surface at a rate of about 0.15% adhesive solids based on the dry weight of the fibrous structure. The fiber consistency is increased to about 97% before the fibrous structure is dry-creped from the Yankee with a doctor blade.

The doctor blade has a bevel angle of about 25° and is positioned with respect to the Yankee dryer to provide an impact angle of about 81°. The Yankee dryer is operated at a temperature of about 275° F. and a speed of about 800 fpm. The fibrous structure is wound in a roll (parent roll) using a surface driven reel drum having a surface speed of about 757 fpm. The basis weight of this fibrous structure (web material) is about 18.1 gsm and has a total dry tensile of about 235 W/in.

Example 8—2-ply Toilet Tissue

Figure 8:
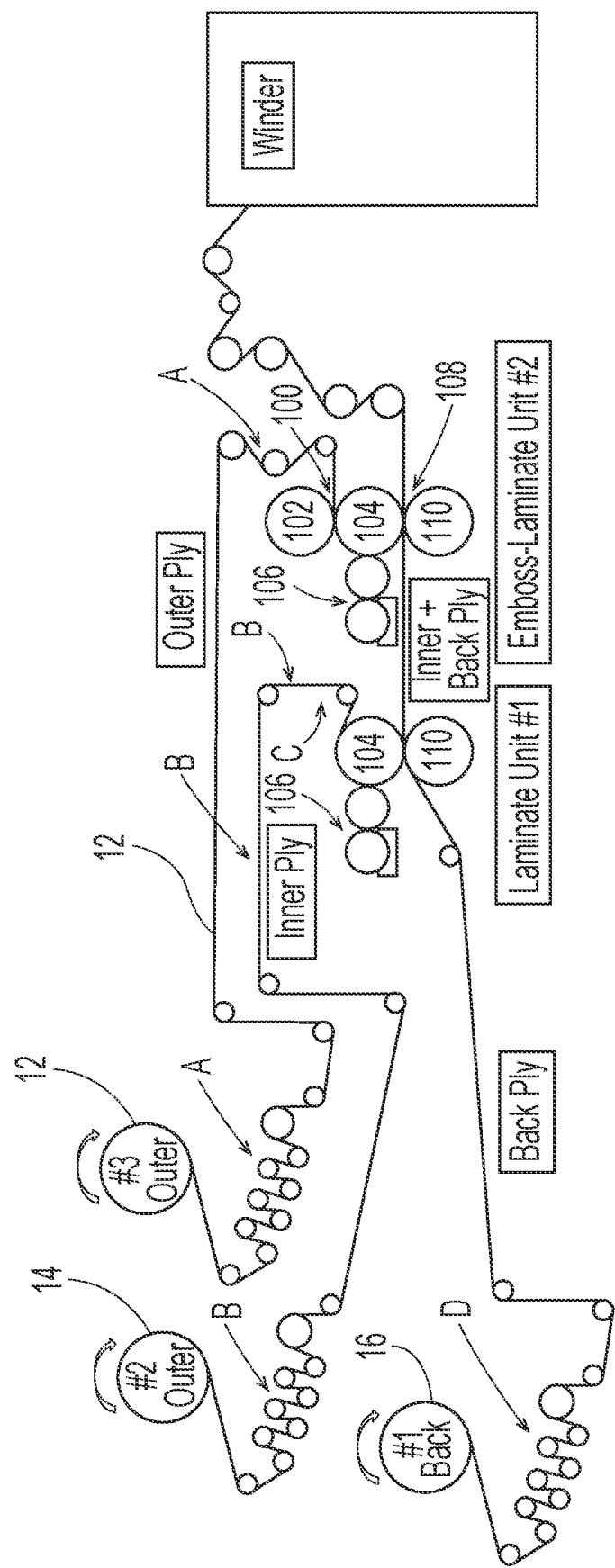
FIG. 8 is a schematic representation of a method for making a toilet tissue according to the present invention.
Figure 9:
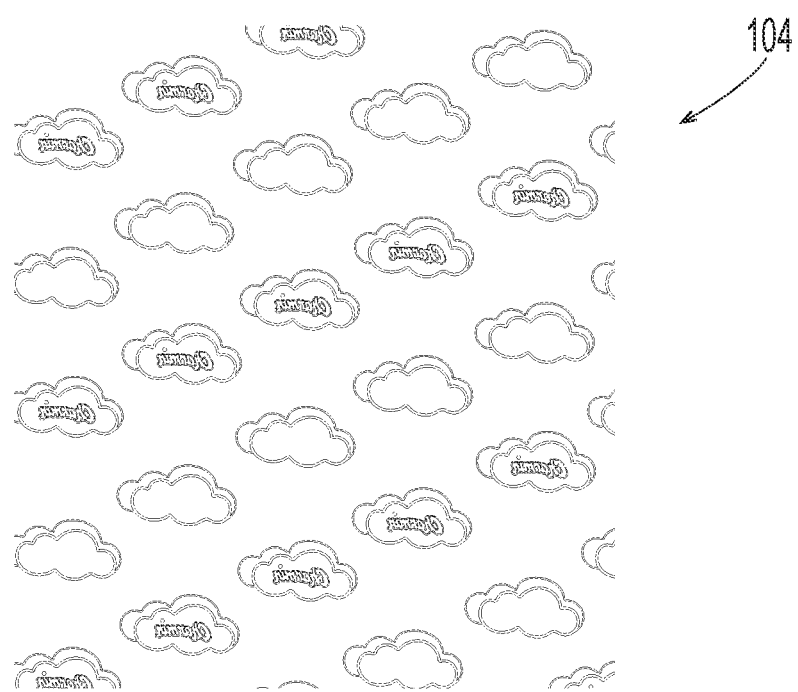
FIG. 9 is an image of an example of an emboss pattern on a steel emboss roll suitable for use with the emboss pattern to a fibrous structure ply according to the present invention.
Figure 10:
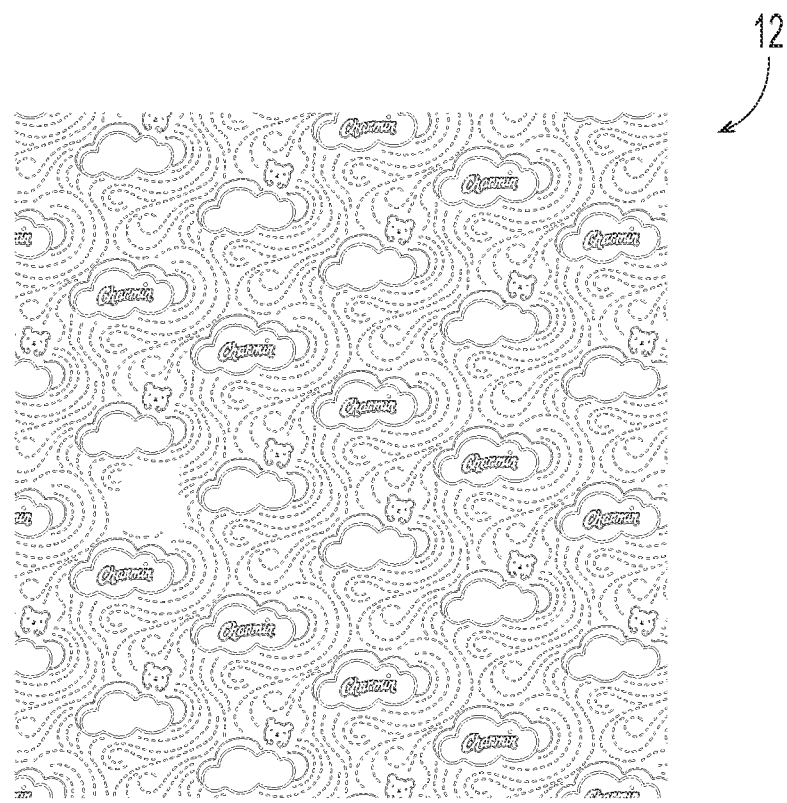
FIG. 10 is an image of a fibrous structure ply with the emboss pattern from FIG. 9 imparted to it from the steel emboss roll.
Figure 11:
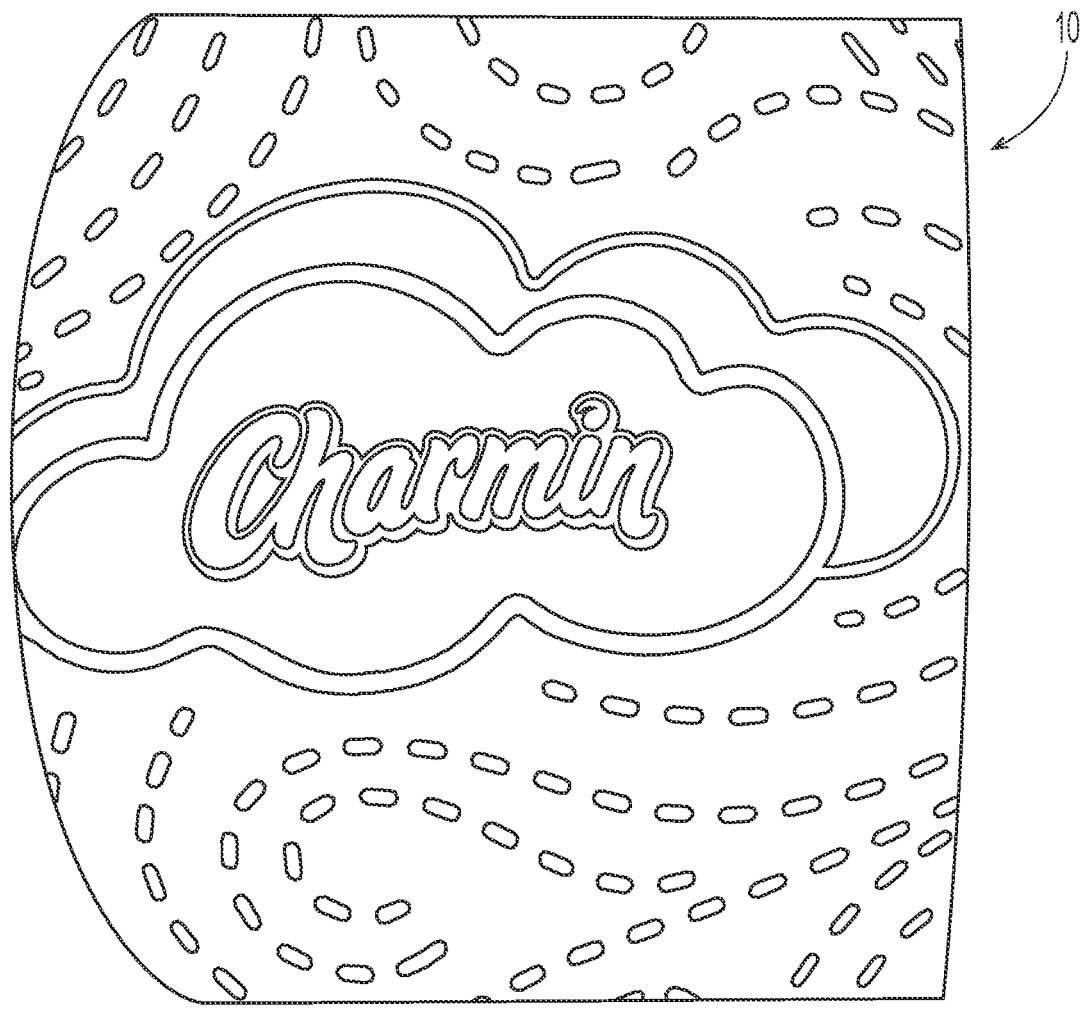
FIG. 11 is an image of a toilet tissue according to the present invention the incorporates as least a portion of the emboss pattern imparted to the fibrous structure ply of FIG. 10.

A toilet tissue according to the present invention, specifically a 2-ply toilet tissue of the present invention is made as follows. As shown in FIG. 8, the method for making a toilet tissue 98 comprises unwinding a first fibrous structure ply 12 (in this case any of the layered fibrous structure plies of Examples 1-5 above) and passing it through a first web path A to an embossing nip 100 formed by a pressure roll 102 and a steel emboss roll 104, a patterned steel emboss roll that contains the emboss pattern shown in FIG. 9, which is a mirror image of the pattern, as shown in FIG. 10, that is imparted to the fibrous structure ply and ultimately the toilet tissue as shown in FIG. 11. After passing through the embossing nip 100, the embossed first fibrous structure ply 12 has adhesive/glue applied to it via a gravure roll/applicator roll system 106, wherein the applicator roll has a first pattern that results in a first plybond area in the resulting toilet tissue.

A second fibrous structure ply 14 (in this case the web material of Example 6 above) is unwound and passed through a second web path B and then is combined with the embossed first fibrous structure ply 12 at a marrying nip 108 formed by the steel emboss roll 104 and a marrying roll 110, which plybonds the embossed first fibrous structure ply 12 to the second fibrous structure ply 14 via the first plybond area to form a 2-ply toilet tissue which is then converted into 2-ply toilet tissue finished product rolls. The resulting 2-ply toilet tissue exhibits the novel properties/characteristics of the present invention.

Example 9—2-ply Toilet Tissue

A toilet tissue according to the present invention, specifically a 2-ply toilet tissue of the present invention is made as follows. As shown in FIG. 8, the method for making a toilet tissue 98 comprises unwinding a fibrous structure ply 12 (in this case the web material of Example 7 above) and passing it through a first web path A to an embossing nip 100 formed by a pressure roll 102 and a steel emboss roll 104, a patterned steel emboss roll that contains the emboss pattern shown in FIG. 9, which is a mirror image of the pattern, as shown in FIG. 10, that is imparted to the fibrous structure ply and ultimately the toilet tissue as shown in FIG. 11. After passing through the embossing nip 100, the embossed first fibrous structure ply 12 has adhesive/glue applied to it via a gravure roll/applicator roll system 106, wherein the applicator roll has a first pattern that results in a first plybond area in the resulting toilet tissue.

A second fibrous structure ply 14 (in this case the web material of Example 6 above) is unwound and passed through a second web path B and then is combined with the embossed first fibrous structure ply 12 at a marrying nip 108 formed by the steel emboss roll 104 and a marrying roll 110, which plybonds the embossed first fibrous structure ply 12 to the second fibrous structure ply 14 via the first plybond area to form a 2-ply toilet tissue which is then converted into 2-ply toilet tissue finished product rolls. The resulting 2-ply toilet tissue exhibits the novel properties/characteristics of the present invention.

Example 10—3-Ply Toilet Tissue

A toilet tissue according to the present invention, specifically a 3-ply toilet tissue of the present invention is made as follows. As shown in FIG. 8, the method for making a toilet tissue 98 comprises unwinding a first fibrous structure ply 12 (in this case any of the layered fibrous structures of Example 1-5 above) and passing it through a first web path A to an embossing nip 100 formed by a pressure roll 102 and a steel emboss roll 104, a patterned steel emboss roll that contains the emboss pattern shown in FIG. 9, which is a mirror image of the pattern, as shown in FIG. 10, that is imparted to the fibrous structure ply and ultimately the toilet tissue as shown in FIG. 11. After passing through the embossing nip 100, the embossed first fibrous structure ply 12 has adhesive/glue applied to it via a gravure roll/applicator roll system 106, wherein the applicator roll has a first pattern that results in a first plybond area in the resulting toilet tissue.

A second fibrous structure ply 14 (in this case the web material of Example 6 above) is unwound and passed through a second web path B and then through a third web path C and then around a steel emboss roll 104 and has adhesive/glue applied to it via a gravure roll/applicator roll system 106, wherein the applicator roll has a first pattern that results in a second plybond area different from and less than the first plybond area in the resulting toilet tissue.

A third fibrous structure ply 16 (in this case the web material of Example 7 above) is unwound and passed through a fourth web path D and then to a marrying nip 108 where it is married and bonded to the second fibrous structure ply 14 via the adhesive/glue present on the second fibrous structure ply 14 to form a 2-ply precursor fibrous structure 112.

The first fibrous structure ply 12 and the 2-ply precursor fibrous structure 112 are then passed to the marrying nip 108 where it is married and bonded to the second fibrous structure ply 14 via the adhesive/glue present on the second fibrous structure ply 14 to form a 3-ply toilet tissue which is then converted into 3-ply toilet tissue finished product rolls. The resulting 3-ply toilet tissue exhibits the novel properties/characteristics of the present invention.

Example 11—3-ply Toilet Tissue

A toilet tissue according to the present invention, specifically a 3-ply toilet tissue of the present invention is made as follows. As shown in FIG. 8, the method for making a toilet tissue 98 comprises unwinding a first fibrous structure ply 12 (in this case the web material of Example 7 above) and passing it through a first web path A to an embossing nip 100 formed by a pressure roll 102 and a steel emboss roll 104, a patterned steel emboss roll that contains the emboss pattern shown in FIG. 9, which is a mirror image of the pattern, as shown in FIG. 10, that is imparted to the fibrous structure ply and ultimately the toilet tissue as shown in FIG. 11. After passing through the embossing nip 100, the embossed first fibrous structure ply 12 has adhesive/glue applied to it via a gravure roll/applicator roll system 106, wherein the applicator roll has a first pattern that results in a first plybond area in the resulting toilet tissue.

A second fibrous structure ply 14 (in this case the web material of Example 6 above) is unwound and passed through a second web path B and then through a third web path C and then around a steel emboss roll 104 and has adhesive/glue applied to it via a gravure roll/applicator roll system 106, wherein the applicator roll has a first pattern that results in a second plybond area different from and less than the first plybond area in the resulting toilet tissue.

A third fibrous structure ply 16 (in this case the web material of Example 7 above) is unwound and passed through a fourth web path D and then to a marrying nip 108 where it is married and bonded to the second fibrous structure ply 14 via the adhesive/glue present on the second fibrous structure ply 14 to form a 2-ply precursor fibrous structure 112.

The first fibrous structure ply 12 and the 2-ply precursor fibrous structure 112 are then passed to the marrying nip 108 where it is married and bonded to the second fibrous structure ply 14 via the adhesive/glue present on the second fibrous structure ply 14 to form a 3-ply toilet tissue which is then converted into 3-ply toilet tissue finished product rolls. The resulting 3-ply toilet tissue exhibits the novel properties/characteristics of the present invention.

Test Methods

Unless otherwise specified, all tests described herein including those described under the Definitions section and the following test methods are conducted on samples that have been conditioned in a conditioned room at a temperature of 23° C.±1.0° C. and a relative humidity of 50%±2% for a minimum of 24 hours prior to the test. All plastic and paper board packaging articles of manufacture, if any, must be carefully removed from the samples prior to testing. The samples tested are "usable units." "Usable units" as used herein means sheets, flats from roll stock, pre-converted flats, fibrous structure, and/or single or multi-ply products. Except where noted all tests are conducted in such conditioned room, all tests are conducted under the same environmental conditions and in such conditioned room. Discard any damaged product. Do not test samples that have defects such as wrinkles, tears, holes, and like. All instruments are calibrated according to manufacturer's specifications.

Basis Weight Test Method

Basis weight of a fibrous structure is measured on stacks of twelve usable units using a top loading analytical balance with a resolution of ±0.001 g. The balance is protected from air drafts and other disturbances using a draft shield. A precision cutting die, measuring 8.890 cm±0.00889 cm by 8.890 cm±0.00889 cm is used to prepare all samples.

With a precision cutting die, cut the samples into squares. Combine the cut squares to form a stack twelve samples thick. Measure the mass of the sample stack and record the result to the nearest 0.001 g.

The Basis Weight is calculated in g/m² as follows:

$$\text{Basis Weight} = (\text{Mass of stack})/[(\text{Area of 1 square in stack}) \times (\text{No. of squares in stack})]$$

$$\text{Basis Weight}(g/m^2) = \text{Mass of stack}(g)/[79.032(cm^2)/10,000(cm^2/m^2) \times 12]$$

Report result to the nearest 0.1 g/m². Sample dimensions can be changed or varied using a similar precision cutter as mentioned above, so as at least 645 square centimeters of sample area is in the stack.

Average Diameter Test Method

This Average Diameter Test Method is used to determine the average diameters of fibrous elements, such as filaments and/or fibers, where their known average diameters are not already known. For example, average diameters of commercially available fibers, such as rayon fibers, have known lengths whereas average diameters of spun filaments, such as spun hydroxyl polymer filaments, would be determined as set forth immediately below. Further, pulp fibers, such as wood pulp fibers, especially commercially available wood pulp fibers would have known diameter (width) from the supplier of the wood pulp or are generally known in the industry and/or can ultimately be measured according to the Kajaani FiberLab Fiber Analyzer SubTest Method described below.

A fibrous structure comprising filaments of appropriate basis weight (approximately 5 to 20 grams/square meter) is cut into a rectangular shape sample, approximately 20 mm by 35 mm. The sample is then coated using a SEM sputter coater (EMS Inc, PA, USA) with gold so as to make the filaments relatively opaque. Typical coating thickness is between 50 and 250 nm. The sample is then mounted between two standard microscope slides and compressed together using small binder clips. The sample is imaged using a 10× objective on an Olympus BHS microscope with the microscope light-collimating lens moved as far from the objective lens as possible. Images are captured using a Nikon D1 digital camera. A Glass microscope micrometer is used to calibrate the spatial distances of the images. The approximate resolution of the images is 1 μm/pixel. Images will typically show a distinct bimodal distribution in the intensity histogram corresponding to the filaments and the background. Camera adjustments or different basis weights are used to achieve an acceptable bimodal distribution. Typically, 10 images per sample are taken and the image analysis results averaged.

The images are analyzed in a similar manner to that described by B. Pourdeyhimi, R. and R. Dent in "Measuring fiber diameter distribution in nonwovens" (Textile Res. J. 69(4) 233-236, 1999). Digital images are analyzed by computer using the MATLAB (Version. 6.1) and the MATLAB Image Processing Tool Box (Version 3.) The image is first converted into a grayscale. The image is then binarized into black and white pixels using a threshold value that minimizes the intraclass variance of the thresholded black and white pixels. Once the image has been binarized, the image is skeletonized to locate the center of each fiber in the image. The distance transform of the binarized image is also computed. The scalar product of the skeletonized image and the distance map provides an image whose pixel intensity is either zero or the radius of the fiber at that location. Pixels within one radius of the junction between two overlapping fibers are not counted if the distance they represent is smaller than the radius of the junction. The remaining pixels are then used to compute a length-weighted histogram of filament diameters contained in the image.

Kajaani FiberLab Fiber Analyzer SubTest Method

Instrument Start-Up:
1. Turn on Kajaani FiberLab Fiber Analyzer unit first, then computer and monitor.
2. Start FiberLab program on computer.

Instrument Operation:
1. File→New (or click on New File icon)
2. "New Fiber Analysis" screen pops up.
   a. Sample Point: select the folder you would like data stored in (to add a new folder see "Adding a New Folder"
   b. Name: add condition or sample name/identifier here
   c. Date
   d. Time
   e. Sample Weight: mg of dry fiber in the 50 ml sample (can leave blank if NOT measuring for coarseness). This is the number calculated in #10 of Sample Prep below.
3. Make sure 50 ml of sample is placed in a "Kajaani beaker" and click "Start"
4. Optional: Distribution→Measured Values
   a. Fibers: the final count of measured fibers should be at least 10,000
   b. Fibers/sec: this number must stay below 70 fibers/sec or the sample will automatically be diluted. If the sample is diluted during an analysis, the coarseness value will be invalid and will need to be discarded.
5. A bar indicating the measurement status of a sample appears on the computer monitor. Do not start an analysis until the indicated status is "Wait State". When the analysis is completed, wait for "Wait State" to appear, then close the "New Fiber Analysis" window. You can now repeat #1-3/4
6. When finished with all samples, close the FiberLab program before turning off the Kajaani FiberLab analyzer unit.
7. Shutdown computer.

Sample Preparation:
  Target Sample Size:
    Softwood: 4 mg/50 ml→160 mg BD in 2000 ml (~170-175 mg from sheet)
    Hardwood: 1 mg/50 ml→40 mg BD in 2000 ml (~40-45 mg from sheet)
  1. For n=3 analysis, weigh and record weight of sample torn (avoiding cut edges) from 3 different pulp sheets of same sample using guidelines above for sample size. Place weighed samples into a suitable container for soaking of pulp.
  2. Using the 3 sheets that samples were torn from, perform moisture content analysis. Note: This step can be skipped if coarseness measurement is not required.
  3. Calculate the actual bone dry weight of the samples weighed in #1, by using the average moisture determined in #2.
  4. Allow pulp samples to soak in water for 10-15 minutes.
  5. Place $1^{st}$ sample and soaking water into the Kajaani manual disintegrator. Fill disintegrator up to 250 ml mark with more water.
  6. Using the "hand dasher", plunge up and down until sample is separated into individual fibers.
  7. Transfer sample to a 2000 ml volumetric flask. Make sure to wash off and collect any fibers that may have adhered to the dasher.
  8. Dilute up to 2000 ml mark. It is important to be as precise as possible for repeatable coarseness results.
  9. Take a 50 ml aliquot and place into a Kajaani beaker. Place beaker on the sampler unit.
  10. Calculate the mg of BD pulp in 50 ml aliquot
      a. (BD mg of sample/2000 ml)×50 ml
  11. Begin Step #1 above in Instrument Operation The water used in this method is City of Cincinnati Water or equivalent having the following properties: Total Hardness=155 mg/L as $CaCO_3$; Calcium content=33.2 mg/L; Magnesium content=17.5 mg/L; Phosphate content=0.0462

Adding a New Folder to Sample Point Menu:
  1. Settings→Common Settings→Sample Folders
     a. Type in name of new folder→Add→OK
  Note: You must close the FiberLab program and re-open program to see the new folder appear in the menu.

Collecting Data in Excel File:
  1. Start FiberLab's Collect 1.12 program.
  2. Open Windows Explorer (not to full screen—you must be able to see both the Explorer and the Collect windows.
  3. In Windows Explorer . . . Select folder that data was stored in
  4. Highlight data to be put in Excel→right click on Copy→drag highlighted samples to the Collect window→Save text
  5. Click "Save In" menu bar and select "My briefcase". Open the 2007 folder, type in file name and click Save. A message will appear saying the selected samples have been saved. Click OK (the sample names will disappear from the Collect window.
  6. Open Excel. Then . . . Open→Look In "My Briefcase" →2007→at bottom, select "All Files (*.*)" in the "Files of Type" bar→find text file just saved and open→click thru the Text Import Wizard screens (next, next, finish)

Caliper Test Method

Caliper of a toilet tissue and/or fibrous structure ply is measured using a ProGage Thickness Tester (Thwing-Albert Instrument Company, West Berlin, NJ) with a pressure foot diameter of 5.08 cm (area of 6.45 $cm^2$) at a pressure of 14.73 $g/cm^2$. Four (4) samples are prepared by cutting of a usable unit such that each cut sample is at least 16.13 cm per side, avoiding creases, folds, and obvious defects. An individual specimen is placed on the anvil with the specimen centered underneath the pressure foot. The foot is lowered at 0.076 cm/sec to an applied pressure of 14.73 $g/cm^2$. The reading is taken after 3 sec dwell time, and the foot is raised. The measure is repeated in like fashion for the remaining 3 specimens. The caliper is calculated as the average caliper of the four specimens and is reported in mils (0.001 in) to the nearest 0.1 mils.

Dry Tensile Test Method: Elongation, Tensile Strength, TEA and Modulus

Elongation, Tensile Strength, TEA and Tangent Modulus are measured on a constant rate of extension tensile tester with computer interface (a suitable instrument is the EJA Vantage from the Thwing-Albert Instrument Co. Wet Berlin, NJ) using a load cell for which the forces measured are within 10% to 90% of the limit of the load cell. Both the movable (upper) and stationary (lower) pneumatic jaws are fitted with smooth stainless steel faced grips, with a design suitable for testing 1 inch wide sheet material (Thwing-Albert item #733GC). An air pressure of about 60 psi is supplied to the jaws.

Twenty usable units of fibrous structures are divided into four stacks of five usable units each. The usable units in each stack are consistently oriented with respect to machine direction (MD) and cross direction (CD). Two of the stacks are designated for testing in the MD and two for CD. Using a one inch precision cutter (Thwing Albert) take a CD stack and cut two, 1.00 in ±0.01 in wide by at least 3.0 in long strips from each CD stack (long dimension in CD). Each strip is five usable unit layers thick and will be treated as a unitary specimen for testing. In like fashion cut the remaining CD stack and the two MD stacks (long dimension in MD) to give a total of 8 specimens (five layers each), four CD and four MD.

Program the tensile tester to perform an extension test, collecting force and extension data at an acquisition rate of 20 Hz as the crosshead raises at a rate of 4.00 in/min (10.16 cm/min) until the specimen breaks. The break sensitivity is set to 50%, i.e., the test is terminated when the measured force drops to 50% of the maximum peak force, after which the crosshead is returned to its original position.

Set the gage length to 2.00 inches. Zero the crosshead and load cell. Insert the specimen into the upper and lower open grips such that at least 0.5 inches of specimen length is contained each grip. Align specimen vertically within the upper and lower jaws, then close the upper grip. Verify specimen is aligned, then close lower grip. The specimen should be under enough tension to eliminate any slack, but less than 0.05 N of force measured on the load cell. Start the tensile tester and data collection. Repeat testing in like fashion for all four CD and four MD specimens.

Program the software to calculate the following from the constructed force (g) verses extension (in) curve:

Tensile Strength is the maximum peak force (g) divided by the product of the specimen width (1 in) and the number of usable units in the specimen (5), and then reported as g/M to the nearest 1 g/in.

Adjusted Gage Length is calculated to as the extension measured at 11.12 g of force (in) added to the original gage length (in).

Elongation is calculated as the extension at maximum peak force (in) divided by the Adjusted Gage Length (in) multiplied by 100 and reported as % to the nearest 0.1%.

Tensile Energy Absorption (TEA) is calculated as the area under the force curve integrated from zero extension to the extension at the maximum peak force (g*in), divided by the product of the adjusted Gage Length (in), specimen width (in), and number of usable units in the specimen (5). This is reported as $g*in/in^2$ to the nearest 1 $g*in/in^2$.

Replot the force (g) verses extension (in) curve as a force (g) verses strain curve. Strain is herein defined as the extension (in) divided by the Adjusted Gage Length (in).

Program the software to calculate the following from the constructed force (g) verses strain curve:

Tangent Modulus is calculated as the least squares linear regression using the first data point from the force (g) verses strain curve recorded after 190.5 g (38.1 g×5 layers) force and the 5 data points immediately preceding and the 5 data points immediately following it. This slope is then divided by the product of the specimen width (2.54 cm) and the number of usable units in the specimen (5), and then reported to the nearest 1 g/cm.

The Tensile Strength (g/in), Elongation (%), TEA ($g*in/in^2$) and Tangent Modulus (g/cm) are calculated for the four CD specimens and the four MD specimens. Calculate an average for each parameter separately for the CD and MD specimens.

Calculations:

Geometric Mean Tensile=Square Root of [MD Tensile Strength(g/in)×CD Tensile Strength (g/in)]

Geometric Mean Peak Elongation=Square Root of [MD Elongation(%)×CD Elongation (%)]

Geometric Mean TEA=Square Root of [MD TEA ($g*in/in^2$)×CD TEA($g*in/in^2$)]

Geometric Mean Modulus=Square Root of [MD Modulus(g/cm)×CD Modulus(g/cm)]

Total Dry Tensile Strength(TDT)=MD Tensile Strength(g/in)+CD Tensile Strength(g/in)

Total TEA=MD TEA($g*in/in^2$)+CD TEA($g*in/in^2$)

Total Modulus=MD Modulus(g/cm)+CD Modulus(g/cm)

Tensile Ratio=MD Tensile Strength(g/in)/CD Tensile Strength(g/in)

Wet Tensile Test Method

Wet tensile for a toilet tissue and/or fibrous structure ply is measured according to ASTM D829-97 for "Wet Tensile Breaking Strength of Paper and Paper Products, specifically by method 11.2 "Test Method B—Finch Procedure." Wet tensile is reported in units of "g/in". Initial Total Wet Tensile is measured immediately after saturation Wet Decay Test Method Wet decay (loss of wet tensile) for a toilet tissue and/or fibrous structure ply is measured according to the Wet Tensile Test Method and is the wet tensile of the toilet tissue and/or fibrous structure ply after it has been standing in the soaked condition in the Finch Cup for 30 minutes. Wet decay is reported in units of "%". Wet decay is the % loss of Initial Total Wet Tensile after the 30 minute soaking.

Flexural Rigidity Test Method

The Flexural Rigidity Test Method determines the overhang length of the present invention based on the cantilever beam principal. The distance a strip of sample can be extended beyond a flat platform before it bends through a specific angle is measured. The inter-action between sheet weight and sheet stiffness measured as the sheet bends or drapes under its own weight through the given angle under specified test conditions is used to calculate the sample Bend Length, Flexural Rigidity, and Bending Modulus.

The method is performed by cutting rectangular strips of samples of the fibrous structure to be tested, in both the cross direction and the machine direction. The Basis Weight of the sample is determined and the Dry Caliper of the samples is measured (as detailed previously). The sample is placed on a test apparatus that is leveled so as to be perfectly horizontal (ex: with a bubble level) and the short edge of the sample is aligned with the test edge of the apparatus. The sample is gently moved over the edge of the apparatus until it falls under its own weight to a specified angle. At that point, the length of sample overhanging the edge of the instrument is measured.

The apparatus for determining the Flexural Rigidity of fibrous structures is comprised of a rectangular sample support with a micrometer and fixed angle monitor. The sample support is comprised of a horizontal plane upon which the sample rectangle can comfortably be supported without any interference at the start of the test. As it is slowly pushed over the edge of the apparatus, it will bend until it breaks the plane of the fixed angle monitor, at which point the micrometer measures the length of overhang.

Eight samples of 25.4 mm×101.5 mm-152.0 mm are cut in the machine direction (MD); eight more samples of the same size are cut in the cross direction (CD). It is important that adjacent cuts are made exactly perpendicular to each other so that each angle is exactly 90 degrees. Samples are arranged such that the same surface is facing up. Four of the MD samples are overturned and four of the CD samples are overturned and marks are made at the extreme end of each, such that four MD samples will be tested with one side facing up and the other four MD samples will be tested with the other side facing up. The same is true for the CD samples with four being tested with one side up and four with the other side facing up.

A sample is then centered in a channel on the horizontal plane of the apparatus with one short edge exactly aligned with the edge of the apparatus. The channel is slightly oversized for the sample that was cut and aligns with the orientation of the rectangular support, such that the sample does not contact the sides of the channel. A lightweight slide bar is lowered over the sample resting in the groove such that the bar can make good contact with the sample and push it forward over the edge of the apparatus. The leading edge of the slide bar is also aligned with the edge of the apparatus and completely covers the sample. The micrometer is aligned with the slide bar and measures the distance the slide bar, thus the sample, advances.

From the back edge of the slide bar, the bar and sample are pushed forward at a rate of approximately 8-13 cm per second until the leading edge of the sample strip bends down and breaks the plane of the fixed angle measurement, set to 45°. At this point, the measurement for overhang is made by reading the micrometer to the nearest 0.5 mm and is reported in units of cm.

The procedure is repeated for each of the 15 remaining samples of the fibrous structure.

Calculations:

Flexural Rigidity is calculated from the overhang length as follows:

Bend Length=Overhang length/2

Where overhang length is the average of the 16 results collected.

The calculation for Flexural Rigidity (G) is:

$$G = 0.1629 * W * C^3 \text{(mg·cm)}$$

Where W is the sample basis weight in pounds/3000 ft² and C is the bend length in cm. The constant 0.1629 converts units to yield Flexural Rigidity (G) in units of milligram·cm.

Bending Modulus (Q)=Flexural Rigidity (G)/Moment of Inertia (I) per unit area.

$$Q = G/I$$

$$Q = \frac{732 * G}{\text{Caliper(mils)}^3}$$

Plate Stiffness Test Method

As used herein, the "Plate Stiffness" test is a measure of stiffness of a flat sample of a toilet tissue and/or fibrous structure ply as it is deformed downward into a hole beneath the sample. For the test, the sample is modeled as an infinite plate with thickness "t" that resides on a flat surface where it is centered over a hole with radius "R". A central force "F" applied to the tissue directly over the center of the hole deflects the tissue down into the hole by a distance "w". For a linear elastic material, the deflection can be predicted by:

$$w = \frac{3F}{4\pi E t^3}(1 - y)(3 + v)R^2$$

where "E" is the effective linear elastic modulus, "v" is the Poisson's ratio, "R" is the radius of the hole, and "t" is the thickness of the tissue, taken as the caliper in millimeters measured on a stack of 4 or 5 tissues under a load of about 0.29 psi. Taking Poisson's ratio as 0.1 (the solution is not highly sensitive to this parameter, so the inaccuracy due to the assumed value is likely to be minor), the previous equation can be rewritten for "w" to estimate the effective modulus as a function of the flexibility test results:

$$E \approx \frac{3R^2}{4t^3} \frac{F}{w}$$

The test results are carried out using an MTS Alliance RT/1, Insight Renew, or similar model testing machine (MTS Systems Corp., Eden Prairie, Minn.), with a 50 newton load cell, and data acquisition rate of at least 25 force points per second. As a stack of four tissue sheets (created without any bending, pressing, or straining) at least 2.5-inches by 2.5 inches, but no more than 5.0 inches by 5.0 inches, oriented in the same direction, sits centered over a hole of radius 15.75 mm on a support plate, a blunt probe of 3.15 mm radius descends at a speed of 20 mm/min. When the probe tip descends to 1 mm below the plane of the support plate, the test is terminated. The maximum slope (using least squares regression) in grams of force/mm over any 0.5 mm span during the test is recorded (this maximum slope generally occurs at the end of the stroke). The load cell monitors the applied force and the position of the probe tip relative to the plane of the support plate is also monitored. The peak load is recorded, and "E" is estimated using the above equation.

Calculations:
The Plate Stiffness "S" per unit width can then be calculated as:

$$S = \frac{Et^3}{12}$$

and is expressed in units of Newtons*millimeters. The Testworks program uses the following formula to calculate stiffness (or can be calculated manually from the raw data output):

$$S = \left(\frac{F}{w}\right)\left[\frac{(3+v)R^2}{16\pi}\right]$$

wherein "F/w" is max slope (force divided by deflection), "v" is Poisson's ratio taken as 0.1, and "R" is the ring radius.

The same sample stack (as used above) is then flipped upside down and retested in the same manner as previously described. This test is run three more times (with the different sample stacks). Thus, eight S values are calculated from four 4-sheet stacks of the same sample. The numerical average of these eight S values is reported as Plate Stiffness for the sample.

Plate Stiffness, Basis Weight Normalized is the quotient of the Average Plate Stiffness, S, in N·mm and the Basis Weight, in grams per square meter (gsm), per the Basis Weight Test Method.

$$\text{Plate Stiffness, } BW \text{ Normalized} = \frac{\text{Avg Plate Stiffness'} S'(N*mm)}{BW(gsm)}$$

Roll Compressibility Test Method

Figure 12:
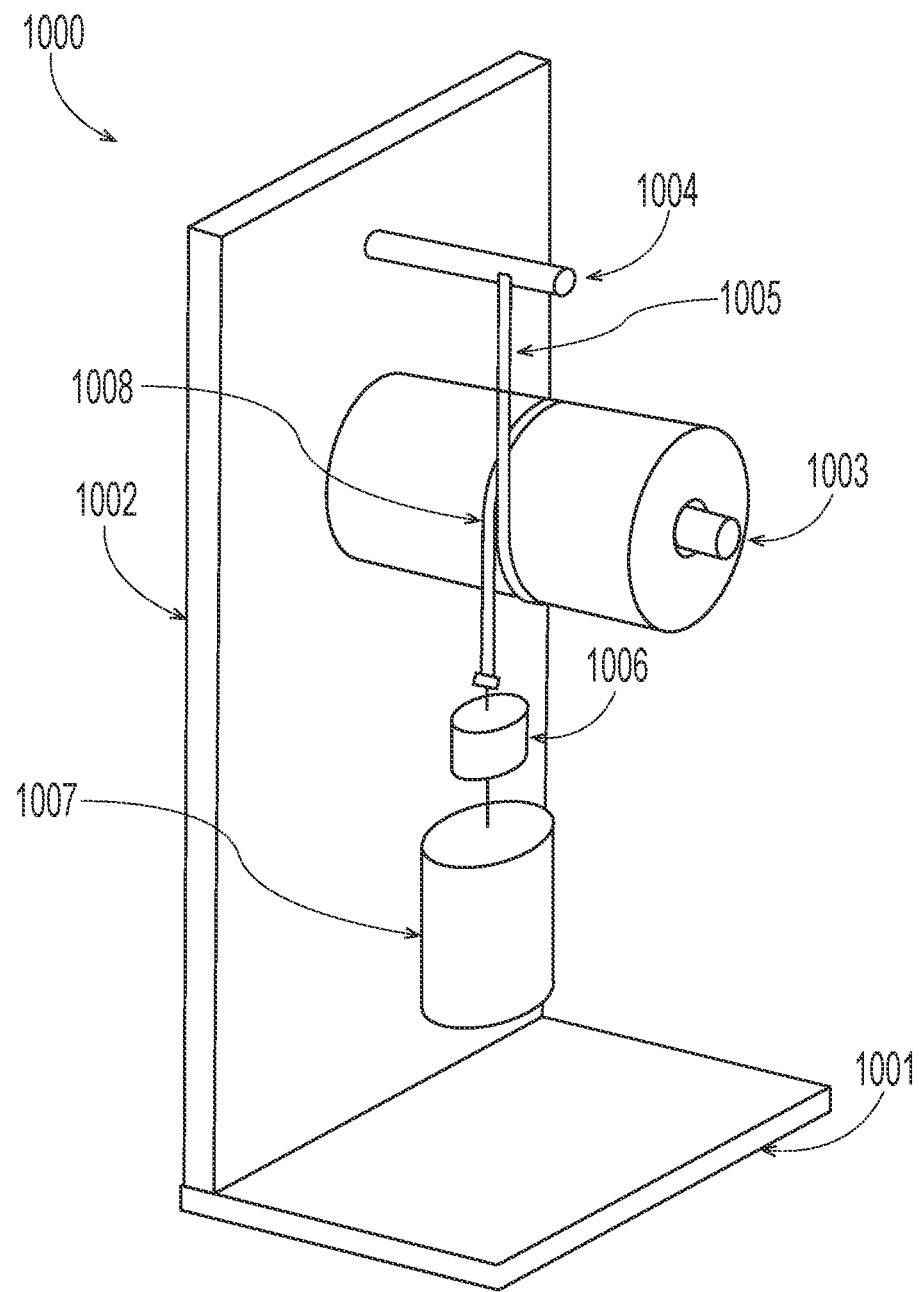
FIG. 12 is a schematic representation of the Roll Compressibility Test Method equipment and set-up.

Roll Compressibility (Percent Compressibility) is determined using the Roll Diameter Tester 1000 as shown in FIG. 12. It is comprised of a support stand made of two aluminum plates, a base plate 1001 and a vertical plate 1002 mounted perpendicular to the base, a sample shaft 1003 to mount the test roll, and a bar 1004 used to suspend a precision diameter tape 1005 that wraps around the circumference of the test roll. Two different weights 1006 and 1007 are suspended from the diameter tape to apply a confining force during the uncompressed and compressed measurement. All testing is performed in a conditioned room maintained at about 23° C.±2 C.° and about 50%±2% relative humidity.

The diameter of the test roll is measured directly using a Pi® tape or equivalent precision diameter tape (e.g. an Executive Diameter tape available from Apex Tool Group, LLC, Apex, NC, Model No. W606PD) which converts the circumferential distance into a diameter measurement so the roll diameter is directly read from the scale. The diameter tape is graduated to 0.01 inch increments with accuracy certified to 0.001 inch and traceable to NIST. The tape is 0.25 in wide and is made of flexible metal that conforms to the curvature of the test roll but is not elongated under the 1100 g loading used for this test. If necessary the diameter tape is shortened from its original length to a length that allows both of the attached weights to hang freely during the test, yet is still long enough to wrap completely around the test roll being measured. The cut end of the tape is modified to allow for hanging of a weight (e.g. a loop). All weights used are calibrated, Class F hooked weights, traceable to NIST.

The aluminum support stand is approximately 600 mm tall and stable enough to support the test roll horizontally throughout the test. The sample shaft 1003 is a smooth aluminum cylinder that is mounted perpendicularly to the vertical plate 1002 approximately 485 mm from the base. The shaft has a diameter that is at least 90% of the inner diameter of the roll and longer than the width of the roll. A small steel bar 1004 approximately 6.3 mm diameter is mounted perpendicular to the vertical plate 1002 approximately 570 mm from the base and vertically aligned with the sample shaft. The diameter tape is suspended from a point along the length of the bar corresponding to the midpoint of a mounted test roll. The height of the tape is adjusted such that the zero mark is vertically aligned with the horizontal midline of the sample shaft when a test roll is not present.

Condition the samples at about 23° C.±2 C.° and about 50%±2% relative humidity for 2 hours prior to testing. Rolls with cores that are crushed, bent or damaged should not be tested. Place the test roll on the sample shaft 1003 such that the direction the paper was rolled onto its core is the same direction the diameter tape will be wrapped around the test roll. Align the midpoint of the roll's width with the suspended diameter tape. Loosely loop the diameter tape 1004 around the circumference of the roll, placing the tape edges directly adjacent to each other with the surface of the tape lying flat against the test sample. Carefully, without applying any additional force, hang the 100 g weight 1006 from the free end of the tape, letting the weighted end hang freely without swinging. Wait 3 seconds. At the intersection of the diameter tape 1008, read the diameter aligned with the zero mark of the diameter tape and record as the Original Roll Diameter to the nearest 0.01 inches. With the diameter tape still in place, and without any undue delay, carefully hang the 1000 g weight 1007 from the bottom of the 100 g weight, for a total weight of 1100 g. Wait 3 seconds. Again read the roll diameter from the tape and record as the Compressed Roll Diameter to the nearest 0.01 inch. Calculate percent compressibility to the according to the following equation and record to the nearest 0.1%:

$$\% \text{ Compressibility} = \frac{\text{(Orginal Roll Diameter)} - \text{(Compressed Roll Diameter)}}{\text{Original Roll Diameter}} \times 100$$

Repeat the testing on 10 replicate rolls and record the separate results to the nearest 0.1%. Average the 10 results and report as the Percent Compressibility to the nearest 0.1%.

CRT Test Method

The absorption (wicking) of water by an absorbent fibrous structure (sample) is measured over time. A sample is placed horizontally in the instrument and is supported by an open weave net structure that rests on a balance. The test is initiated when a tube connected to a water reservoir is raised and the meniscus makes contact with the center of the sample from beneath, at a small negative pressure. Absorption is allowed to occur for 2 seconds after which the contact is broken and the cumulative rate for the first 2 seconds is calculated.

Apparatus

Conditioned Room—Temperature is controlled from 73° F.+2° F. (23° C.+1° C.). Relative Humidity is controlled from 50%+2%

Sample Preparation—Product samples are cut using hydraulic/pneumatic precision cutter into 7.62 cm diameter circles, at least 2.54 cm from any edge, cutting 2 replicates for each test.

Capacity Rate Tester (CRT)—The CRT is an absorbency tester capable of measuring capacity and rate. The CRT consists of a balance (0.001 g), on which rests on a woven grid (using nylon monofilament line having a 0.014" diameter) placed over a small reservoir with a delivery tube in the center. This reservoir is filled by the action of solenoid valves, which help to connect the sample supply reservoir to an intermediate reservoir, the water level of which is monitored by an optical sensor. The CRT is run with a −2 mm water column, controlled by adjusting the height of water in the supply reservoir.

Software—LabView based custom software specific to CRT Version 4.2 or later.

Water—Distilled water with conductivity<10 µS/cm (target<5 µS/cm) @ 25° C.

For this method, a usable unit is described as one finished product unit regardless of the number of plies. Condition all samples with packaging materials removed for a minimum of 2 hours prior to testing. Discard at least the first ten usable units from the roll. Remove two usable units and cut one 7.62 cm circular sample from the center of each usable unit for a total of 2 replicates for each test result. Do not test samples with defects such as wrinkles, tears, holes, etc. Replace with another usable unit which is free of such defects Pre-Test Set-Up
1. The water height in the reservoir tank is set −2.0 mm below the top of the support rack (where the sample will be placed).
2. The supply tube (8 mm I.D.) is centered with respect to the support net.
3. Test samples are cut into circles of 7.62 cm diameter and equilibrated at Tappi environment conditions for a minimum of 2 hours.

Test Description
1. After pressing the start button on the software application, the supply tube moves to 0.33 mm below the water height in the reserve tank. This creates a small meniscus of water above the supply tube to ensure test initiation. A valve between the tank and the supply tube closes, and the scale is zeroed.
2. The software prompts you to "load a sample". A sample is placed on the support net, centering it over the supply tube, and with the side facing the outside of the roll placed downward.
3. Close the balance windows, and press the "OK" button—the software records the dry weight of the circle.
4. The software prompts you to "place cover on sample". The plastic cover is placed on top of the sample, on top of the support net. The plastic cover has a center pin (which is flush with the outside rim) to ensure that the sample is in the proper position to establish hydraulic connection. Four other pins, 1 mm shorter in depth, are positioned 1.25-1.5 inches radially away from the center pin to ensure the sample is flat during the test. The sample cover rim should not contact the sheet. Close the top balance window and click "OK".
5. The software re-zeroes the scale and then moves the supply tube towards the sample. When the supply tube reaches its destination, which is 0.33 mm below the support net, the valve opens (i.e., the valve between the reserve tank and the supply tube), and hydraulic connection is established between the supply tube and the sample. Data acquisition occurs at a rate of 5 Hz, and is started about 0.4 seconds before water contacts the sample.

6. The test runs for 2 seconds. After this, the supply tube pulls away from the sample to break the hydraulic connection.

7. The wet sample is removed from the support net. Residual water on the support net and cover are dried with a paper towel.

8. Repeat until all samples are tested.

9. After each test is run, a *.txt file is created (typically stored in the CRT/data/rate directory) with a file name as typed at the start of the test. The file contains all the test set-up parameters, dry sample weight, and cumulative water absorbed (g) vs. time (sec) data collected from the test.

10. The software records the weight of water acquisition and the time and from this calculates the CRT Rate (g/sec) and the CRT Capacity (g/g, which is grams water/gram fibrous structure).

Weight Average Molecular Weight Test Method

The weight average molecular weight and the molecular weight distribution (MWD) are determined by Gel Permeation Chromatography (GPC) using a mixed bed column. The column (Waters linear ultrahydrogel, length/ID: 300× 7.8 mm) is calibrated with a narrow molecular weight distribution polysaccharide, 107,000 g/mol from Polymer Laboratories). The calibration standards are prepared by dissolving 0.024 g of polysaccharide and 6.55 g of the mobile phase in a scintillation vial at a concentration of 4 mg/ml. The solution sits undisturbed overnight. Then it is gently swirled and filtered with a 5 micron nylon syringe filter into an auto-sampler vial.

The filtered sample solution is taken up by the auto-sampler to flush out previous test materials in a 100 µL injection loop and inject the present test material into the column. The column is held at 50° C. using a Waters TCM column heater. The sample eluded from the column is measured against the mobile phase background by a differential refractive index detector (Wyatt Optilab REX interferometric refractometer) and a multi-angle later light scattering detector (Wyatt DAWN Heleos 18 angle laser light detector) held at 50° C. The mobile phase is water with 0.03M potassium phosphate, 0.2M sodium nitrate, and 0.02% sodium azide. The flowrate is set at 0.8 mL/min with a run time of 35 minutes.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A multi-ply toilet tissue comprising at least one fibrous structure ply comprising a plurality of fibrous elements, wherein the multi-ply toilet tissue exhibits a caliper of greater than 20.0 mils as measured according to a Caliper Test Method and a Capacity Rate Tester (CRT) Capacity of greater than 15 g/g as measured according to a Capacity Rate Tester (CRT) Test Method.

2. The multi-ply toilet tissue according to claim 1 wherein the caliper is from about 27.0 to about 32.0 mils as measured according to the Caliper Test Method.

3. The multi-ply toilet tissue according to claim 1 wherein the Capacity Rate Tester (CRT) Capacity is from about 20 g/g to about 28 g/g as measured according to the Capacity Rate Tester (CRT) Test Method.

4. The multi-ply toilet tissue according to claim 1 wherein the multi-ply toilet tissue exhibits a Capacity Rate Tester (CRT) Rate of less than about 1.0 g/sec as measured according to the Capacity Rate Tester (CRT) Test Method.

5. The multi-ply toilet tissue according to claim 1 wherein the multi-ply toilet tissue exhibits a Total Wet Decay of greater than 30% as measured according to a Wet Decay Test Method.

6. The multi-ply toilet tissue according to claim 1 wherein the multi-ply toilet tissue exhibits an Initial Total Wet Tensile of greater than 30 g/in as measured according to a Wet Tensile Test Method.

7. The multi-ply toilet tissue according to claim 1 wherein the at least one fibrous structure ply comprises a structured fibrous structure ply.

8. The multi-ply toilet tissue according to claim 1 wherein the plurality of fibrous elements comprises pulp fibers.

9. The multi-ply toilet tissue according to claim 1 wherein the plurality of fibrous elements comprises filaments selected from the group consisting of: polyvinyl alcohol filaments, polysaccharide filaments, polysaccharide derivative filaments, and combinations thereof.

10. The multi-ply toilet tissue according to claim 1 wherein the multi-ply toilet tissue further comprises a second fibrous structure ply.

11. A multi-ply toilet tissue comprising at least one fibrous structure ply comprising a plurality of fibrous elements, wherein the multi-ply toilet tissue exhibits a caliper of greater than 20.0 mils as measured according to a Caliper Test Method and a Plate Stiffness of less than 8.00 N*mm as measured according to a Plate Stiffness Test Method.

12. The multi-ply toilet tissue according to claim 11 wherein the caliper is from about 27.0 to about 32.0 mils as measured according to the Caliper Test Method.

13. The multi-ply toilet tissue according to claim 11 wherein the multi-ply toilet tissue exhibits a Capacity Rate Tester (CRT) Capacity of from about 20 g/g to about 28 g/g as measured according to a Capacity Rate Tester (CRT) Test Method.

14. The multi-ply toilet tissue according to claim 11 wherein the multi-ply toilet tissue exhibits a Capacity Rate Tester (CRT) Rate of less than about 1.0 g/sec as measured according to a Capacity Rate Tester (CRT) Test Method.

15. The multi-ply toilet tissue according to claim 11 wherein the multi-ply toilet tissue exhibits a Total Wet Decay of greater than 30% as measured according to a Wet Decay Test Method.

16. The multi-ply toilet tissue according to claim 11 wherein the multi-ply toilet tissue exhibits an Initial Total Wet Tensile of greater than 30 g/in as measured according to a Wet Tensile Test Method.

17. The multi-ply toilet tissue according to claim 11 wherein the at least one fibrous structure ply comprises a structured fibrous structure ply.

18. The multi-ply toilet tissue according to claim 11 wherein the plurality of fibrous elements comprises pulp fibers.

19. The multi-ply toilet tissue according to claim 11 wherein the plurality of fibrous elements comprises filaments selected from the group consisting of: polyvinyl alcohol filaments, polysaccharide filaments, polysaccharide derivative filaments, and combinations thereof.

20. The multi-ply toilet tissue according to claim 11 wherein the multi-ply toilet tissue further comprises a second fibrous structure ply.

* * * * *